(12) United States Patent
Sato et al.

(10) Patent No.: US 12,021,466 B2
(45) Date of Patent: Jun. 25, 2024

(54) CHARACTERISTIC EVALUATION DEVICE AND CHARACTERISTIC EVALUATION METHOD OF SHAFT COUPLING

(71) Applicants: MIKI PULLEY CO., LTD., Kanagawa (JP); NATIONAL UNIVERSITY CORPORATION KOBE UNIVERSITY, Hyogo (JP)

(72) Inventors: Ryuta Sato, Hyogo (JP); Makoto Taniyama, Shiga (JP); Masaharu Hirosawa, Kanagawa (JP); Takayuki Satomi, Kanagawa (JP); Taichi Sasaki, Kanagawa (JP)

(73) Assignees: MIKI PULLEY CO., LTD., Kanagawa (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 219 days.

(21) Appl. No.: 17/633,774

(22) PCT Filed: Aug. 7, 2020

(86) PCT No.: PCT/JP2020/030395
§ 371 (c)(1),
(2) Date: Feb. 8, 2022

(87) PCT Pub. No.: WO2021/029366
PCT Pub. Date: Feb. 18, 2021

(65) Prior Publication Data
US 2022/0278638 A1 Sep. 1, 2022

(30) Foreign Application Priority Data

Aug. 9, 2019 (JP) .................................. 2019-147561
Jun. 26, 2020 (JP) .................................. 2020-110679

(51) Int. Cl.
*H02P 23/30* (2016.01)
*G01H 1/00* (2006.01)
(Continued)

(52) U.S. Cl.
CPC ............. *H02P 23/30* (2016.02); *G01H 1/003* (2013.01); *G01H 1/14* (2013.01); *G01H 1/16* (2013.01);
(Continued)

(58) Field of Classification Search
CPC ............ G01H 1/003; G01H 1/10; G01H 1/14; G01H 1/16; G01M 13/022; G01M 13/025; G01M 13/028; H02P 23/186; H02P 23/30
See application file for complete search history.

(56) References Cited

U.S. PATENT DOCUMENTS 2,332,068 A    10/1943    Gustave

FOREIGN PATENT DOCUMENTS

CN    104634569    5/2015
JP    H03-282717   12/1991
(Continued)

OTHER PUBLICATIONS

Hong et al, Analysis of Shaft Torsional Vibration in Inverter-Fed Induction Motor Drive Systems, IEEE (Year: 1993).*
(Continued)

*Primary Examiner* — David L Singer
(74) *Attorney, Agent, or Firm* — Dority & Manning, P.A.

(57) ABSTRACT

To provide a characteristic evaluation device that can properly evaluate a characteristic of a shaft coupling while considering a delay in a response of a motor, a characteristic evaluation device of a shaft coupling includes: a motor system including a drive motor, a rotation angle sensor configured to acquire a rotation angle of a drive shaft, and a motor control unit configured to control the drive motor
(Continued)

based on a torque command; a rotational load connected to a driven shaft; and a processor configured to output the torque command and calculate a frequency response of a gain of an amplitude of an angular velocity ω of the rotation angle, wherein the processor is configured to calculate a characteristic of the shaft coupling based on a response characteristic of the motor system and the frequency response.

14 Claims, 14 Drawing Sheets

(51) Int. Cl.
　　*G01H 1/14*　　　(2006.01)
　　*G01H 1/16*　　　(2006.01)
　　*G01M 13/022*　　(2019.01)
　　*G01M 13/028*　　(2019.01)
　　*H02P 23/18*　　　(2016.01)

(52) U.S. Cl.
　　CPC ........ *G01M 13/022* (2013.01); *G01M 13/028* (2013.01); *H02P 23/186* (2016.02)

(56) References Cited

FOREIGN PATENT DOCUMENTS

| JP | H 07238947 A | 9/1995 | | |
|---|---|---|---|---|
| JP | H08-136408 | 5/1996 | | |
| JP | 2014-122804 | 7/2014 | | |
| JP | 2005325980 A | 11/2015 | | |
| JP | 2017211829 A | * | 11/2017 | ............ G05B 11/32 |
| JP | 2018-007287 | 1/2018 | | |
| JP | 2018-173702 | 11/2018 | | |
| WO | WO 2019067336 A2 | 4/2019 | | |

OTHER PUBLICATIONS

Tsyss et al, Flexible coupling dynamic analysis as a ship shafting part, IEEE (Year: 2016).*

Yang et al, Shaft Torque Limiting Control Using Shaft Torque Compensator for Two-Inertia Elastic System With Backlash, IEEE/ASME Transactions on Mechatronics, vol. 21, No. 6, Dec. 2016 (Year: 2016).*

Valenzuela et al, Evaluation of Torsional Oscillations in Paper Machine Sections, IEEE Xplore (Year: 2004).*

Stopa et al, An Evaluation of the MCSA Method When Applied to Detect Faults in Motor Driven Loads, IEEE (Year: 2010).*

PCT International Search Report (w/ English translation) for corresponding PCT Application No. PCT/JP2020/030395, dated Sep. 29, 2020, 6 pages.

Nagao et al., "Influence of Coupling and Ball Screw onto the Torsional Vibration Mode of Feed Drive System," (with English translation) Proceedings of Academic Lectures in Autumn Conference of The Japan Society for Precision Engineering in 2017, pp. 425-426.

Office Action for Indian Application No. 202247011425, dated Jul. 28, 2022, 6 pages.

* cited by examiner

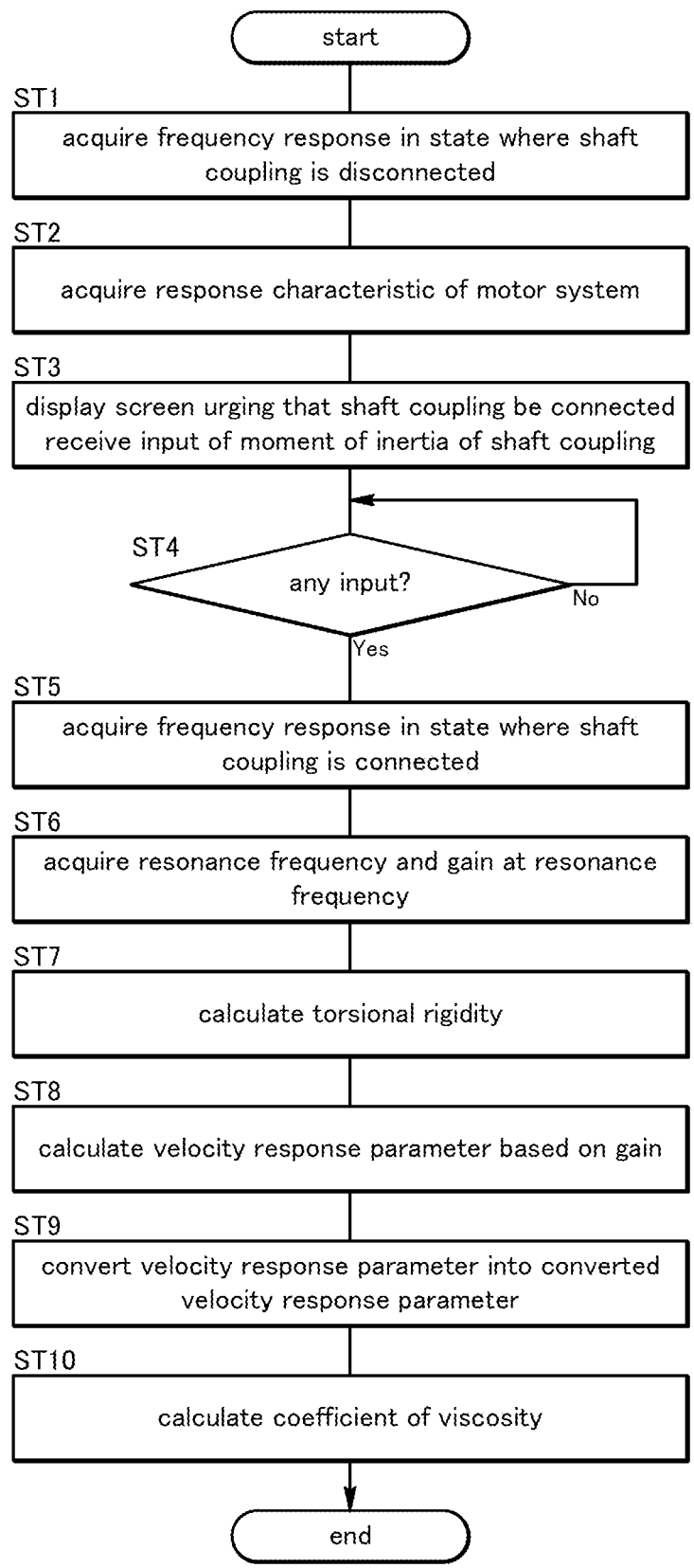

CHARACTERISTIC EVALUATION DEVICE AND CHARACTERISTIC EVALUATION METHOD OF SHAFT COUPLING

CROSS REFERENCE TO RELATED APPLICATIONS

This application is the U.S. National Stage entry of International Application No. PCT/JP2020/030395 filed under the Patent Cooperation Treaty and having a filing date of Aug. 7, 2020, which claims priority to Japanese Patent Application No. 2019-147561, filed on Aug. 9, 2019, and Japanese Patent Application No. 2020-110679, filed on Jun. 26, 2020, all of which are incorporated herein by reference.

TECHNICAL FIELD

The present invention relates to a characteristic evaluation device and a characteristic evaluation method for evaluating a characteristic of a machine element, and more particularly, to a characteristic evaluation device and a characteristic evaluation method of a shaft coupling configured to connect two shafts.

BACKGROUND ART

A positioning device that positions a fed object is known (for example, Patent Document 1). The positioning device includes a feed drive mechanism (linearly moving mechanism) that moves the fed object linearly by converting rotational motion into linear motion and is characterized by an identifying method of physical parameters. In Patent Document 1, a frequency response of the positioning device is measured by using a frequency response analyzer or a servo analyzer, and a resonance value and a resonance frequency are acquired based on the measurement result thereof. Then, a natural angular frequency, damping coefficient, spring constant, and viscous friction resistance of the feed drive mechanism is calculated based on the acquired resonance value and the acquired resonance frequency (for example, Patent Document 1).

In most cases, the feed drive mechanism includes a shaft coupling configured to connect a rotation shaft of a motor and a screw shaft of a hall screw. The shaft coupling of the feed drive mechanism is a machine element that transmits torque of the motor to the ball screw while allowing the misalignment and swing of the above two shafts, and is known for its great influence on a characteristic of the feed drive mechanism (for example, Non-Patent Document 1).

PRIOR ART DOCUMENT(S)

Patent Document(s)

[Patent Document 1] JPH03-282717A

Non-Patent Document(s)

[Non-Patent Document 1] Atsushi NAGAO, Ryuta SATO, Keiichi SHIRASE, Takeshi HASHIMOTO, and Taichi SASAKI, "Influence of Coupling and Ball Screw onto the Torsional Vibration Mode of Feed Drive System", Proceedings of Academic Lectures in Autumn Conference of The Japan Society for Precision Engineering in 2017, p. 425 to 426

SUMMARY OF THE INVENTION

Task to be Accomplished by the Invention

To improve the performance of the feed drive mechanism, it is important to evaluate a characteristic of the shaft coupling more accurately. Patent Document 1 may lead to a configuration that a motor and a load are connected by a shaft coupling and a frequency response of a gain is measured while drive torque of the motor is set as input and an angular velocity of the motor is set as output. By using the measured frequency response, a resonance value and a resonance frequency can be acquired, so that a torsional rigidity and a torsional coefficient of elasticity, which are physical parameters characterizing the shaft coupling, can be identified.

However, the inventors have found that the accuracy of the identified physical parameters may be deteriorated depending on a response characteristic of a motor system from the time a torque command is issued to cause the motor to generate the drive torque to the time the drive torque is generated.

In view of the above problem of the prior art, a primary object of the present invention is to provide a characteristic evaluation device and a characteristic evaluation method of a shaft coupling that can properly evaluate a characteristic of the shaft coupling while considering a response characteristic of a motor system.

Means to Accomplish the Task

The first aspect of the present invention provides a characteristic evaluation device (1, 101) of a shaft coupling (4) for evaluating a characteristic of the shaft coupling configured to connect a drive shaft (2) and a driven shaft (3) so as to transmit torque from the drive shaft to the driven shaft, the characteristic evaluation device comprising: a motor system (5) including a drive motor (11) configured to apply drive torque to the drive shaft, a rotation angle sensor (14) configured to acquire a rotation angle of the drive shaft, and a motor control unit (13) configured to control the drive motor based on a given torque command ($T_{ref}$) so as to cause the drive motor to output torque corresponding to the torque command; a rotational load (18) connected to the driven shaft; and a processor (21) configured to output the torque command to the motor control unit so as to output the drive torque of a prescribed value and configured to calculate a frequency response of a gain of an amplitude of an angular velocity ($\omega$) of the rotation angle against an amplitude of the torque corresponding to the torque command based on the rotation angle detected by the rotation angle sensor, wherein the processor is configured to calculate the characteristic of the shaft coupling based on a response characteristic of the motor system and the frequency response calculated in a state where the shaft coupling connects the drive shaft and the driven shaft.

According to this aspect, the characteristic of the shaft coupling is calculated in consideration of the response characteristic of the motor system, and thus it is possible to more properly evaluate the characteristic of the shaft coupling.

According to the second aspect of the present invention, the processor is configured to use, as the response characteristic of the motor system, a transfer function ($G^*(s)$) until when the drive motor is driven according to the torque command and generates the torque corresponding to the torque command, acquire the frequency response in a state where the shaft coupling is connected, acquire a resonance frequency ($f_0$) of the shaft coupling and the gain at the resonance frequency based on the frequency response, calculate a torsional rigidity ($K_c$) of the shaft coupling by using the resonance frequency, and calculate a coefficient of viscosity ($c_c$) of the shall coupling by using the transfer function, the torsional rigidity, and the gain at the resonance frequency.

According to this aspect, it is possible to easily calculate the torsional rigidity of the shaft coupling by using the frequency response. Further, the coefficient of viscosity of the shaft coupling can be calculated in consideration of the transfer function from the time the torque command is given to the drive motor to the time the torque is applied to the drive shaft. Accordingly, the coefficient of viscosity is calculated in consideration of the response characteristic of the motor system, so that the accuracy of the calculated coefficient of viscosity can be improved.

According to the third aspect of the present invention, the processor is configured to convert, by using the transfer function, the gain at the resonance frequency into a converted value corresponding to the gain at the resonance frequency in a case where the transfer function is one, and calculate the coefficient of viscosity of the shaft coupling by using the torsional rigidity and the converted value.

According to this aspect, it is possible to convert, by using the transfer function, the gain at the resonance frequency into the gain in a case where the transfer function of the motor system is one. Accordingly, it is possible to calculate the coefficient of viscosity of the shaft coupling by using a model in a case where the transfer function of the motor system is one.

According to the fourth aspect of the present invention, the processor is configured to acquire the response characteristic of the motor system based on the frequency response at a time the drive motor is driven in a state where the shaft coupling is not connected to the drive shaft and the driven shaft.

According to this aspect, by acquiring the frequency response of the motor system, it is possible to calculate the transfer function from the time the torque command is given to the drive motor to the time the torque is applied to the drive shaft.

The fifth aspect of the present invention provides a characteristic evaluation method of a shaft coupling (4) for evaluating a characteristic of the shaft coupling by using a characteristic evaluation device (1), the shaft coupling being configured to connect a drive shaft (2) and a driven shaft (3) so as to transmit torque from the drive shaft to the driven shaft, the characteristic evaluation device comprising: a motor system (5) including a drive motor (11) configured to apply drive torque to the drive shaft, a rotation angle sensor (14) configured to acquire a rotation angle of the drive shaft, and a motor control unit (13) configured to control the drive motor based on a given torque command ($T_{ref}$) so as to cause the drive motor to output torque corresponding to the torque command; and a rotational load (18) connected to the driven shaft, wherein the characteristic evaluation device is configured to output the torque command to the motor control unit so as to output the drive torque of a prescribed value and configured to calculate a frequency response of a gain of an amplitude of an angular velocity of the rotation angle against an amplitude of the torque corresponding to the torque command based on the rotation angle detected by the rotation angle sensor, the characteristic evaluation method comprising: acquiring the frequency response in a state where the shaft coupling connects the drive shaft and the driven shaft (ST5); and calculating the characteristic of the shaft coupling based on the acquired frequency response and a response characteristic of the motor system (ST7, ST10).

According to this aspect, the characteristic of the shaft coupling is calculated in consideration of the response characteristic of the motor system, and thus it is possible to more properly evaluate the characteristic of the shaft coupling.

According to the sixth aspect of the present invention, the characteristic evaluation method comprises acquiring the frequency response in a state where the shaft coupling is connected (ST5); acquiring a resonance frequency ($f_0$) of the shaft coupling and the gain at the resonance frequency based on the frequency response (ST6); calculating a torsional rigidity ($K_c$) of the shaft coupling by using the resonance frequency (ST7); and calculating a coefficient of viscosity ($c_c$) of the shaft coupling by using the torsional rigidity, the gain at the resonance frequency, and a transfer function until when the drive motor is driven according to the torque command as the response characteristic of the motor system and generates the torque corresponding the torque command (ST9, ST10).

According to this aspect, it is possible to easily calculate the torsional rigidity of the shaft coupling by using the frequency response. Further, the coefficient of viscosity of the shaft coupling can be calculated in consideration of the transfer function from the time the torque command is given to the drive motor to the time the torque is applied to the drive shaft. Accordingly, the coefficient of viscosity is calculated in consideration of the response characteristic of the motor system, so that the accuracy of the calculated coefficient of viscosity can be improved.

According to the seventh aspect of the present invention, in the step of calculating the coefficient of viscosity of the shaft coupling, converting, by using the transfer function ($G^*(s)$), the gain at the resonance frequency into a converted value ($M_{f_0}$) corresponding to the gain at the resonance frequency in a case where the transfer function is one (ST9), and calculating the coefficient of viscosity of the shaft coupling by using the torsional rigidity and the converted value (ST10).

According to this aspect, it is possible to convert, by using the transfer function, the gain at the resonance frequency into the gain in a case where the transfer function of the motor system is one. Accordingly, it is possible to calculate the coefficient of viscosity of the shaft coupling by using a model in a case where the transfer function of the motor system is one.

According to the eighth aspect of the present invention, the characteristic evaluation method comprises acquiring the response characteristic of the motor system based on the frequency response at a time the drive motor is driven in a state where the shaft coupling is not connected to the drive shaft and the driven shaft.

According to this aspect, by acquiring the frequency response of the motor system, it is possible to calculate the transfer function from the time the torque command is given to the drive motor to the time the torque is applied to the drive shaft.

According to the ninth aspect of the present invention, in the characteristic evaluation device (101) of the shaft coupling, the processor is configured to output the torque command to the motor control unit so as to output the drive torque of plural amplitudes in a state where the shaft coupling connects the drive shaft and the driven shaft, calculate the frequency response corresponding to each amplitude, calculate the characteristic of the shaft coupling corresponding to each amplitude based on the response characteristic of the motor system and the calculated frequency response, and output a relationship between the characteristic of the shaft coupling and at least one of an amplitude of the torque command, an amplitude of the drive torque at a resonance frequency of the shaft coupling, an amplitude of the rotation angle at the resonance frequency, and an amplitude of the angular velocity at the resonance frequency.

According to this aspect, it is possible to output the dependency of the characteristic of the shaft coupling on the amplitude of the drive torque applied to the shaft coupling. Accordingly, the user can properly evaluate the dependency of the characteristic of the shaft coupling on the input, and thus it is possible to presume the vibration characteristic under various driving conditions and design an appropriate control system.

According to the tenth aspect of the present invention, the processor is configured to acquire a torsional rigidity of the shaft coupling for the calculated frequency response corresponding to each amplitude, and output a relationship between the torsional rigidity of the shaft coupling and at least one of the amplitude of the torque command, the amplitude of the drive torque at the resonance frequency, the amplitude of the rotation angle at the resonance frequency, and the amplitude of the angular velocity at the resonance frequency.

According to this aspect, it is possible to output the dependency of the torsional rigidity of the shaft coupling on the amplitude of the drive torque. Accordingly, it is possible to properly evaluate the dependency of the shaft coupling on the input. Further, since the dependency of the torsional rigidity on the amplitude is output, the output contents can be easily understood by the user and the characteristic evaluation device of the shaft coupling can be more convenient.

According to the eleventh aspect of the present invention, the processor is configured to output the torque command to the motor control unit so as to output the drive torque of plural amplitudes, acquire the frequency response corresponding to each amplitude, calculate a coefficient of viscosity of the shaft coupling for the acquired frequency response corresponding to each amplitude, and output a relationship between the coefficient of viscosity of the shaft coupling and at least one of the amplitude of the torque command, the amplitude of the drive torque at the resonance frequency, the amplitude of the rotation angle at the resonance frequency, and the amplitude of the angular velocity at the resonance frequency.

According to this aspect, it is possible to output the dependency of the coefficient of viscosity of the shaft coupling on the amplitude of the drive torque. Accordingly, it is possible to properly evaluate the dependency of the shaft coupling on the input. Further, since the dependency of the coefficient of viscosity on the amplitude is output, the output contents can be easily understood by the user and the characteristic evaluation device of the shaft coupling can be more convenient.

According to the twelfth aspect of the present invention, the characteristic evaluation method comprises: causing the motor system to output the drive torque of plural amplitudes in a state where the shaft coupling connects the drive shaft and the driven shaft, acquiring the frequency response corresponding to each amplitude, and calculating the characteristic of the shaft coupling corresponding to each amplitude based on the acquired frequency response and the response characteristic of the motor system.

According to this aspect, it is possible to evaluate the dependency of the characteristic of the shaft coupling on the amplitude of the drive torque applied to the shaft coupling. Accordingly, it is possible to presume the vibration characteristic under various driving conditions and design an appropriate control system.

According to the thirteenth aspect of the present invention, the characteristic evaluation method comprises: acquiring the frequency response corresponding to plural amplitudes in a state where the shaft coupling is connected, acquiring a resonance frequency of the shaft coupling and the gain at the resonance frequency based on the frequency response corresponding to each amplitude, calculating a torsional rigidity of the shaft coupling corresponding to each amplitude by using the resonance frequency, and outputting a relationship between the torsional rigidity of the shaft coupling and at least one of an amplitude of the torque command, an amplitude of the drive torque at the resonance frequency, an amplitude of the rotation angle at the resonance frequency, and an amplitude of the angular velocity at the resonance frequency.

According to this aspect, it is possible to evaluate the dependency of the torsional rigidity of the shaft coupling on the amplitude of the drive torque. Accordingly, it is possible to presume the vibration characteristic under various driving conditions and design an appropriate control system, and the evaluated contents can be easily understood by the user.

According to the fourteenth aspect of the present invention, the characteristic evaluation method comprises: calculating a coefficient of viscosity of the shaft coupling at each amplitude by using the torsional rigidity, the gain at the resonance frequency, and a transfer function until when the drive motor is driven according to the torque command as the response characteristic of the motor system and generates the torque corresponding the torque command; and outputting a relationship between the coefficient of viscosity of the shaft coupling and at least one of the amplitude of the torque command, the amplitude of the drive torque at the resonance frequency, the amplitude of the rotation angle at the resonance frequency, and the amplitude of the angular velocity at the resonance frequency.

According to this aspect, it is possible to evaluate the dependency of the coefficient of viscosity of the shaft coupling on the amplitude of the drive torque. Accordingly, it is possible to presume the vibration characteristic under various driving conditions and design an appropriate control system, and the evaluated contents can be easily understood by the user.

Effect of the Invention

Thus, according to the present invention, it is possible to provide a characteristic evaluation device and a characteristic evaluation method of a shaft coupling that can properly evaluate a characteristic of the shaft coupling while considering a response characteristic of a motor system.

BRIEF DESCRIPTION OF THE DRAWINGS

FIG. 9 is a flowchart of an evaluation process according to the first embodiment;

DETAILED DESCRIPTION OF THE INVENTION

In the following, embodiments of the present invention will be described with reference to the drawings.

The First Embodiment

A characteristic evaluation device 1 according to the present embodiment is a device for evaluating characteristics of a shaft coupling 4 (coupling) configured to connect a drive shaft 2 and a driven shaft 3 to transmit torque of the rotating drive shaft 2 to the driven shaft 3. More specifically, the characteristic evaluation device 1 according to the present embodiment can quantitatively evaluate a torsional rigid- ity $K_c$ [Nm/rad] and a coefficient of viscosity $c_c$ [Nm/(rad/s)], which are the characteristics of the shaft coupling 4.

Figure 1:
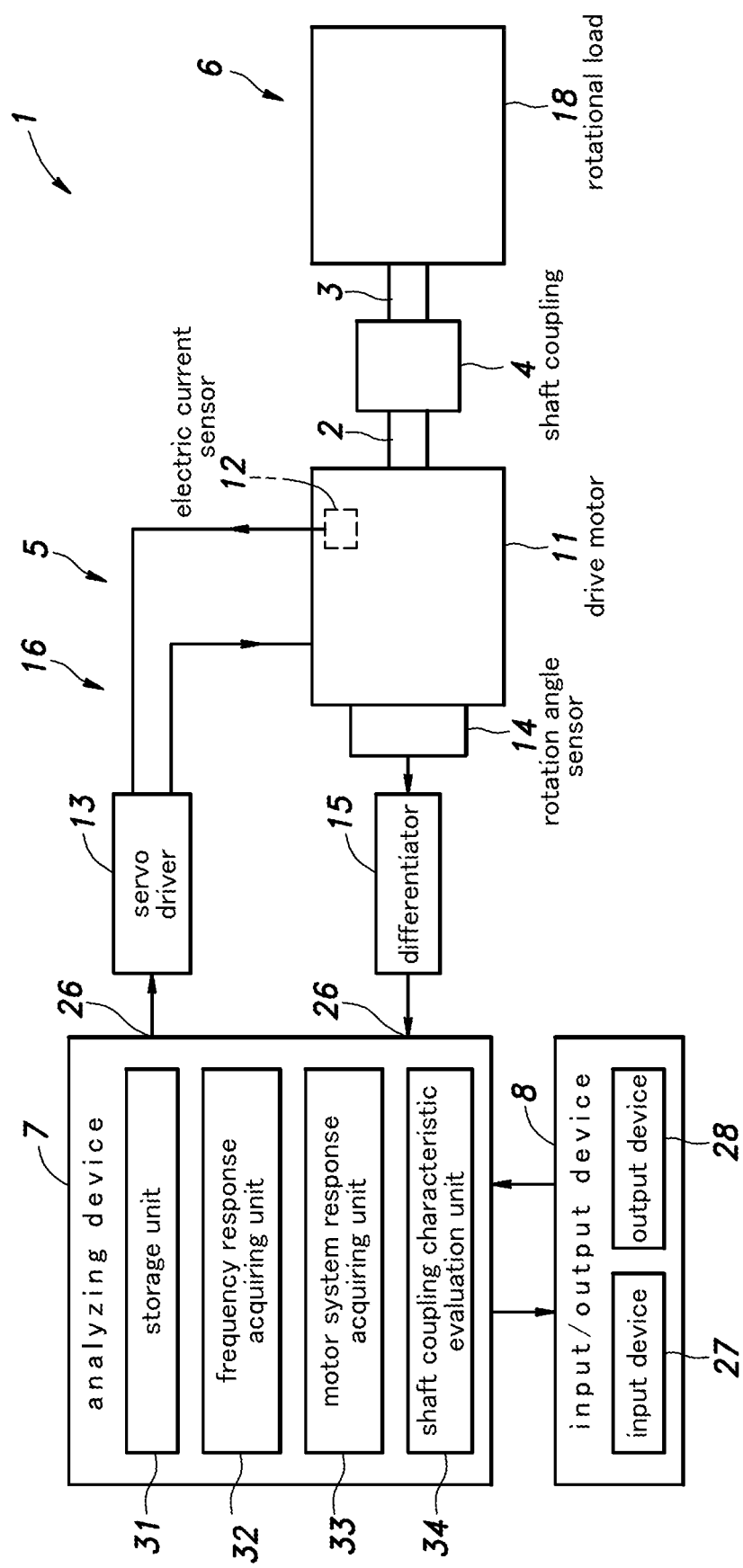
FIG. 1 is a functional block diagram for explaining a state of a characteristic evaluation device when a shaft coupling connects a drive shaft and a driven shaft.

As shown in FIG. 1, the characteristic evaluation device 1 includes a motor system 5 provided with the drive shaft 2, a driven device 6 provided with the driven shaft 3, an analyzing device 7, and an input/output device 8. When the characteristics of the shaft coupling 4 are evaluated, the shaft coupling 4 to be evaluated is arranged so as to connect the drive shaft 2 and the driven shaft 3.

The motor system 5 includes a drive motor 11, an electric current sensor 12, a servo driver 13 (motor control unit), a rotation angle sensor 14, and a differentiator 15.

The drive motor 11 consists of a general-purpose servo motor, and is arranged such that the drive shaft 2 as an output shaft thereof extends substantially horizontally. The drive motor 11 is configured to apply drive torque $T_m$ to the drive shaft 2. The electric current sensor 12 is a sensor configured to measure a current value of an electric current (hereinafter referred to as "drive current") flowing through the drive motor 11. The servo driver 13 is configured to supply the drive current to the drive motor 11 and control the drive motor 11 by controlling the current value of the drive current so as to cause the drive motor 11 to output torque (hereinafter referred to as "command torque value") corresponding to a torque command $T_{ref}$ input from the analyzing device 7. More specifically, the servo driver 13 is configured to perform feedback control of the drive current such that the deviation between the current value acquired by the electric current sensor 12 and the current value corresponding to the command torque value becomes zero. That is, the servo driver 13, the electric current sensor 12, and the drive motor 11 form a current loop (feedback loop), and work together to function as a servo system 16 (servo mechanism) that is automatically driven so as to cause the drive shaft 2 to output the drive torque $T_m$ corresponding to a control amount (torque).

The rotation angle sensor 14 is the so-called rotary encoder configured to measure a rotation angle of the drive shaft 2, and may include an optical, magnetic, or capacitive detection element.

The differentiator 15 is connected to the rotation angle sensor 14 and the analyzing device 7. The differentiator 15 is configured to acquire the rotation angle of the drive shaft 2 from the rotation angle sensor 14, calculate an angular velocity ω by differentiating the rotation angle with respect to time, and output the angular velocity ω to the analyzing device 7.

The driven device 6 includes not only the driven shaft 3 but also a rotational load 18 connected to the driven shaft 3 and configured to apply a load to rotational motion of the driven shaft 3. The rotational load 18 may consist of a disk or the like having a prescribed moment of inertia. Alternatively, the rotational load 18 may consist of a motor having substantially the same shape as the drive motor 11 or a motor having a different size from the drive motor 11. In such a case, an output shaft of the motor may be fixed to the driven shaft 3. The driven device 6 itself may consist of a motor having substantially the same shape as the drive motor 11 or a motor having a different size from the drive motor 11. When the motor is used as the driven device 6, an output shaft thereof may be used as the driven shaft 3. When the motor is used as the rotational load 18 or the driven device 6, it is possible to change the load applied to the driven shaft 3 by giving the motor a command relating to the torque, the rotation angle of the driven shaft 3, the angular velocity of the driven shaft 3, or the like. Accordingly, it is possible to give a characteristic test of the shaft coupling 4 while changing a state of the load.

Figure 2:
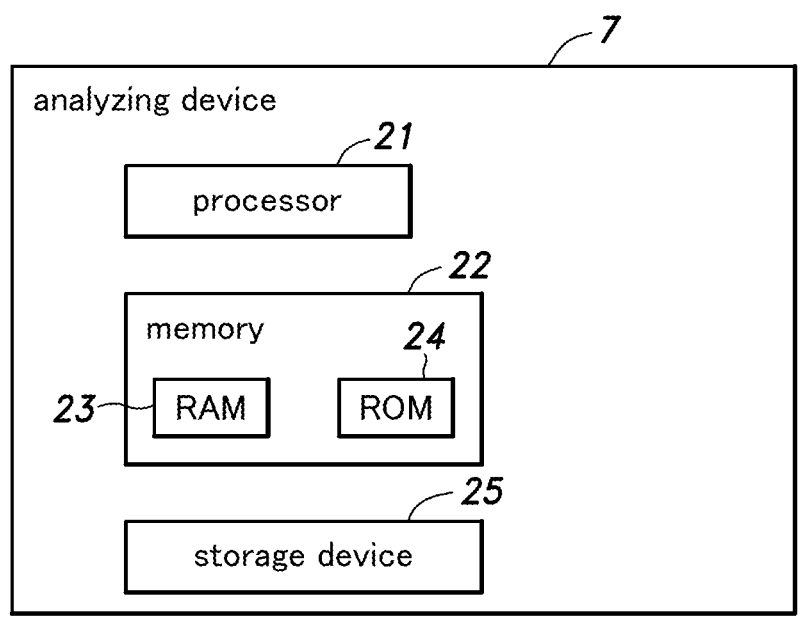
FIG. 2 is a block diagram showing hardware of the characteristic evaluation device.

The analyzing device 7 is a device configured to output the torque command $T_{ref}$ to the servo driver 13 and calculate the characteristics of the shaft coupling 4 based on the rotation angle of the drive shaft 2, more specifically, based on the angular velocity ω the differentiator 15 calculates by differentiating the rotation angle with respect to time. As shown in FIG. 2, the analyzing device 7 includes at least one processor 21 composed of a computer provided with known hardware and configured to execute a process based on a prescribed program and a memory 22 configured to store data and the like necessary for the process. The memory 22 includes a Random Access Memory 23 (RAM) configured to function as a work area or the like of the processor 21 and a Read Only Memory 24 (ROM) configured to store programs executed by the processor 21, data, or the like. In the present embodiment, the analyzing device 7 further includes a storage device 25 such as an HDD or an SSD and a plurality of input/output ports 26 (see FIG. 1) for connecting circumferential devices.

The input/output device 8 is a device configured to receive an input by a user and display the acquired characteristics of the shaft coupling 4 to the user. The input/output device 8 is connected to the analyzing device 7 via the input/output port 26. The input/output device 8 includes an input device 27 such as a keyboard and a mouse used by the user for various settings for the analyzing device 7 and an output device 28 such as a liquid crystal monitor for displaying an analysis result. The input/output device 8 may consist of a computer provided with a monitor and a keyboard.

The servo driver 13 is also connected to the analyzing device 7 via the input/output port 26. Accordingly, the analyzing device 7 and the servo driver 13 are configured to communicate with each other. For example, the analyzing device 7 is configured to output the torque command $T_{ref}$ to the servo driver 13 via the input/output port 26. The differentiator 15 is also connected to the analyzing device 7 via the input/output port 26. Accordingly, the analyzing device 7 is configured to communicate with the differentiator 15. For example, the analyzing device 7 is configured to acquire the angular velocity ω of the drive shaft 2 from the differentiator 15.

The analyzing device 7 includes a storage unit 31, a frequency response acquiring unit 32, a motor system response acquiring unit 33, and a shaft coupling characteristic evaluation unit 34. The processor 21 executes an evaluation program to acquire the characteristics of the shaft coupling 4, and thus the frequency response acquiring unit 32, the motor system response acquiring unit 33, and the shaft coupling characteristic evaluation unit 34 are realized.

The storage unit 31 is realized by the memory 22 and configured to appropriately store information required for the process executed by the frequency response acquiring unit 32, the motor system response acquiring unit 33, and the shaft coupling characteristic evaluation unit 34. Further, the storage unit 31 is configured to store a moment of inertia $J_m$ of a rotor of the drive motor 11 and a moment of inertia $J_L$ of the rotational load 18. Incidentally, the exact values of the moment of inertia $J_m$ of the rotor of the drive motor 11 and the moment of inertia $J_L$ of the rotational load 18 are known based on the designs and specifications thereof.

The frequency response acquiring unit 32 outputs the torque command $T_{ref}$ to the servo driver 13 to cause the servo driver 13 to output torque that vibrates with a prescribed amplitude while changing the frequency. At the same time, the frequency response acquiring unit 32 acquires the angular velocity ω from the differentiator 15. Then, the frequency response acquiring unit 32 calculates the ratio (hereinafter referred to as "velocity response parameter M") of the amplitude of the angular velocity ω to the amplitude of the torque corresponding to the torque command $T_{ref}$, namely, the amplitude of the command torque value. Then, the frequency response acquiring unit 32 converts the velocity response parameter M into a gain (hereinafter referred to as "gain G") by using the following equation (1).

$$G = 20 \log_{10} M \quad (1)$$

The frequency response acquiring unit 32 outputs the torque command $T_{ref}$ while changing the frequency within a prescribed range, thereby acquiring the frequency response (for example, see FIGS. 4 and 6) that shows a relationship between the frequency and the gain of the angular velocity ω of the rotation angle against the amplitude of the torque corresponding to the torque command $T_{ref}$.

Incidentally, the torque command $T_{ref}$ output by the frequency response acquiring unit 32 may be, for example, an M-sequence signal (maximum length sequence signal) that causes the drive motor 11 to output the torque whose amplitude changes randomly as the drive torque $T_m$, or an impulse signal that causes the drive motor 11 to output the torque whose amplitude changes in a pulse shape as the drive torque $T_m$. The frequency response acquiring unit 32 may acquire a temporal change in the gain, and then transform the temporal change in the torque corresponding to the torque command $T_{ref}$ and the temporal change of the gain by using the Fourier transform so as to acquire the frequency response indicating the relationship between the frequency and the gain by using the transformed two temporal changes.

Figure 3:
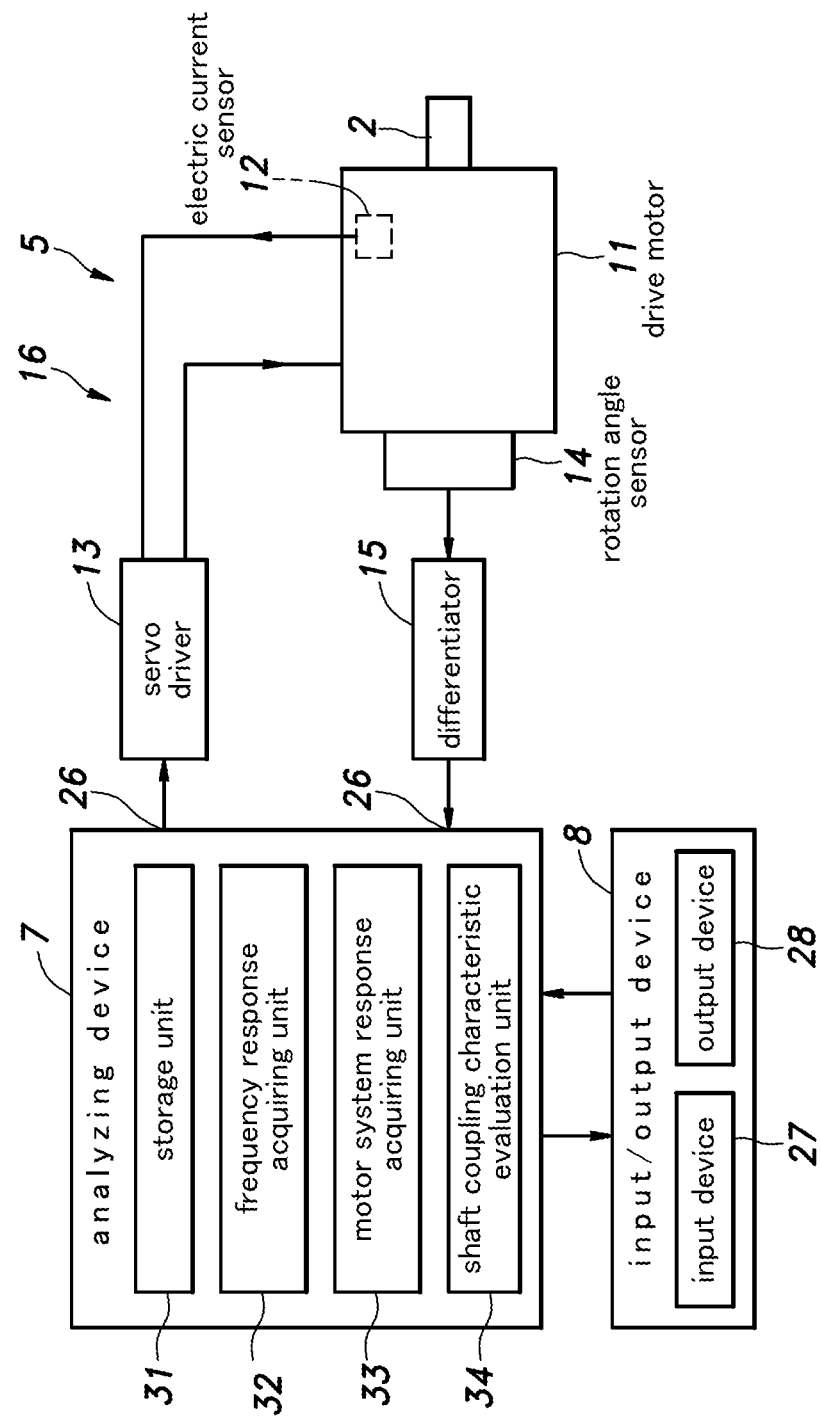
FIG. 3 is a functional block diagram for explaining a state of the characteristic evaluation device at the time the shaft coupling is disconnected.

As shown in FIG. 3, in a state where the shaft coupling 4 is disconnected, the frequency response acquiring unit 32 drives the drive motor 11 to acquire the frequency response (see FIG. 4), and the motor system response acquiring unit 33 identifies the response characteristic of the motor system 5 from the acquired frequency response.

More specifically, the motor system response acquiring unit 33 identifies a response band w such that the frequency response acquired in a state where the shaft coupling 4 is disconnected matches the frequency response calculated based on the block diagram (for example, FIG. 5) corresponding to a state where the shaft coupling 4 is disconnected. Various known methods such as a least squares method and a searching method for numerical solutions can be used as a method for matching the frequency response acquired in a state where the shaft coupling 4 is disconnected with the frequency response calculated based on the block diagram.

The abovementioned response band w corresponds to a value acquired by converting the so-called cutoff frequency into the angular velocity ω, and is one of the parameters relating to the response characteristic of the motor. In the present embodiment, the response band w corresponds to a parameter in a case where the response characteristic of the motor system 5 is expressed as a transfer function G*(s) of a first-order delay system. There is a prescribed delay from the time the torque command $T_{ref}$ is input to the servo driver 13 to the time the drive torque $T_m$ is applied to the drive shaft 2. Accordingly, for example, when the torque command $T_{ref}$ is input to the servo driver 13 so as to generate the torque that vibrates sinusoidally while increasing the frequency (namely, the angular velocity ω), it is generally difficult for the motor to follow the torque command $T_{ref}$ at a frequency equal to or higher than the cutoff frequency, and the drive torque $T_m$ actually output to the drive shaft 2 becomes smaller than the torque to be output to the drive shaft 2 based on the torque command $T_{ref}$. Incidentally, the response band w may be a parameter in a case where the response characteristic of the motor system 5 is expressed as a transfer function of a high-order delay system.

More specifically, when the torque command $T_{ref}$ that vibrates at the angular velocity ω is given to the drive motor 11 and the ratio of the amplitude of the drive torque $T_m$ actually output to the drive shaft 2 to the amplitude of the torque (command torque value) to be output to the drive shaft 2 is expressed in decibels, the angular velocity ω at which the value of the abovementioned ratio expressed in decibels becomes −3 dB is the response band w. 2π times the response band w corresponds to the cutoff frequency, and the cutoff frequency corresponds to a reciprocal of a period (hereinafter referred to as "delay period") from the time the torque command $T_{ref}$ is given to the time the drive torque $T_m$ is applied to the drive shaft 2. In a frequency band lower than the cutoff frequency, the amplitude of the drive torque $T_m$ is substantially equal to the amplitude of the torque command $T_{ref}$. In a frequency band higher than the cutoff frequency, the amplitude of the drive torque $T_m$ becomes smaller than the amplitude of the torque command $T_{ref}$ as the frequency increases. In other words, the response band w corresponds to the angular velocity ω at which the amplitude of the drive torque $T_m$ becomes smaller than the amplitude of the torque command $T_{ref}$ and these two amplitudes begin to deviate from each other when the angular velocity ω (namely, the frequency) increases from an angular velocity area where the motor system 5 sufficiently follows the torque command $T_{ref}$. Upon completing the identification of the response hand w, the motor system response acquiring unit 33 outputs the response band w to the shaft coupling characteristic evaluation unit 34.

The shaft coupling characteristic evaluation unit 34 is configured to calculate the characteristics of the shaft coupling 4 based on the response characteristic of the motor system 5 and the frequency response acquired in a state where the shaft coupling 4 connects the drive shaft 2 and the driven shaft 3.

Figure 6:
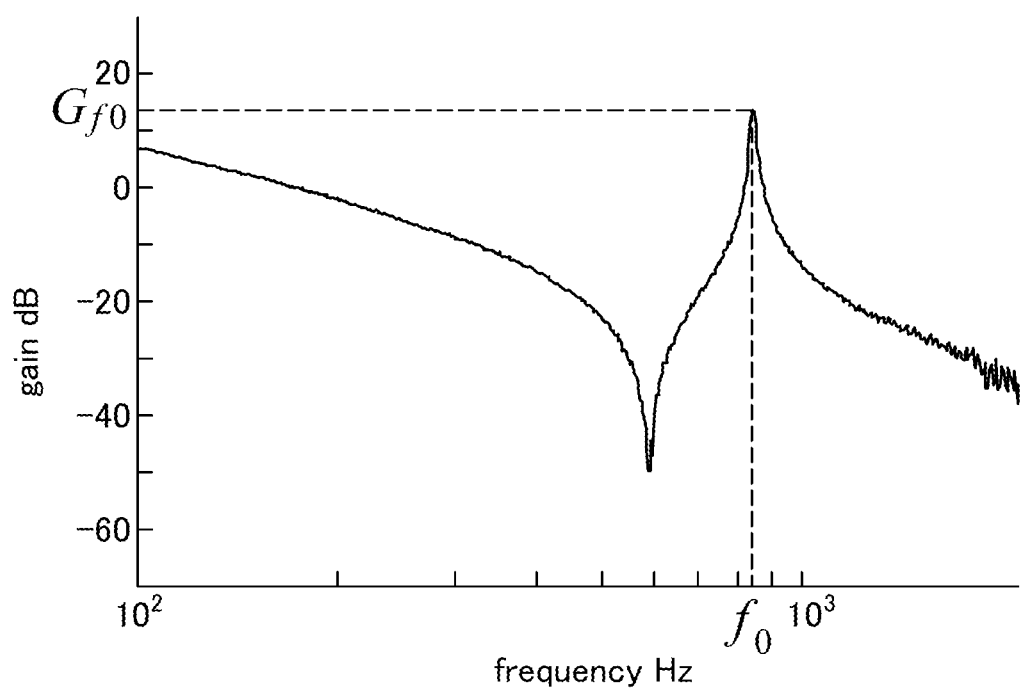
FIG. 6 is a graph showing the frequency response acquired in a state where the shaft coupling connects the drive shaft and the driven shaft.

More specifically, as shown in FIG. 6, the shaft coupling characteristic evaluation unit 34 first acquires the frequency corresponding to the peak of the gain G based on the frequency response acquired in a state where the shaft coupling 4 connects the drive shaft 2 and the driven shaft 3, and sets the acquired frequency to the resonance frequency $f_0$. Further, the shaft coupling characteristic evaluation unit 34 acquires the gain G at the resonance frequency $f_0$ based on the frequency response acquired in a state where the shaft coupling 4 connects the drive shaft 2 and the driven shaft 3, and sets the acquired gain G to the gain $^{exp}G_{f0}$ (gain $G_{f0}$) at the resonance frequency $f_0$.

Next, the shaft coupling characteristic evaluation unit 34 calculates the torsional rigidity $K_c$ by substituting the resonance frequency $f_0$ for "$f_0$" in the following equation (2).

$$K_c = \frac{(2\pi f_0)^2 J_1 J_2}{(J_1 + J_2)} \quad (2)$$

Incidentally, $J_1$ in the equation (2) is the moment of inertia [Kgm²] on the side of the drive motor 11, and $J_2$ in the equation (2) is the moment of inertia [Kgm²] on the side of the rotational load 18. $J_1$ is the sum of the moment of inertia $J_m$ of the rotor of the drive motor 11 and half of the moment of inertia $J_c$ of the shaft coupling 4 to be evaluated, and $J_2$ is the sum of the moment of inertia $J_L$ of the rotational load 18 and half of the moment of inertia $J_c$ of the shaft coupling 4 to be evaluated. The moment of inertia $J_c$ of the shaft coupling 4 to be evaluated is input by the user when the characteristics of the shaft coupling 4 are evaluated.

Figure 7:
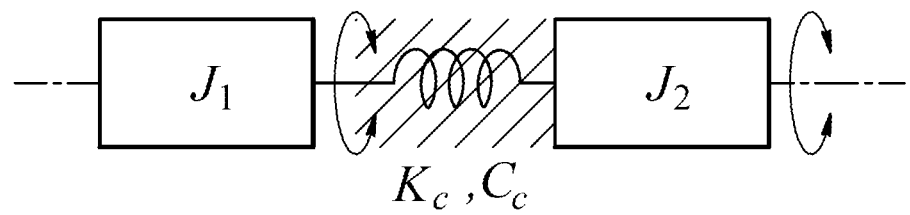
FIG. 7 is a block diagram showing a vibration model of a two inertial system.

The equation (2) corresponds to an equation acquired by solving, with respect to $K_c$, the following equation (3) indicating the resonance frequency $f_0$ in a case where the drive motor 11 and the rotational load 18 connected by the shaft coupling 4 are regarded as a vibration model of a two inertial system shown in FIG. 7.

$$f_0 = \frac{1}{2\pi} \sqrt{\frac{K_c(J_1 + J_2)}{J_1 J_2}} \quad (3)$$

Next, the shaft coupling characteristic evaluation unit 34 substitutes the gain $^{exp}G_{f0}$ (gain $G_{f0}$) at the resonance frequency $f_0$ acquired based on the frequency response for the left side (G) of the equation (1), thereby converting the gain $^{exp}G_{f0}$ into the velocity response parameter $^{exp}M_{f0}$.

After that, the shaft coupling characteristic evaluation unit 34 converts the velocity response parameter $^{exp}M_{f0}$ at the resonance frequency $f_0$ into a converted velocity response parameter $M_{f0}$ (converted value) based on the following equation (4) by using the calculated torsional rigidity $K_c$, the response band w, and the moments of inertia $J_1$ and $J_2$. The converted velocity response parameter $M_{fo}$ corresponds to the velocity response parameter in a case where the response hand w at the resonance frequency $f_0$ is infinite (in a case where the delay period is zero), that is, in a case where the transfer function from the torque command $T_{ref}$ to the drive torque $T_m$ is one.

$$M_{f0} = \frac{^{exp}M_{f0}}{M_{f0w}} \quad (4)$$

Incidentally, $M_{f0w}$ in the equation (4) is the ratio of the amplitude of presumed torque to the amplitude of the torque command $T_{ref}$ at the resonance frequency $f_0$. The presumed torque is the torque presumed to be applied to the drive shaft 2 in a case where the motor system 5 is approximated as a first-order delay system. $M_{f0w}$ in the equation (4) is calculated by using the following equation (5).

$$M_{f0w} = \frac{w}{\sqrt{(2\pi f_0)^2 + w^2}} = \frac{w}{\sqrt{\frac{K_c(J_1 + J_2)}{J_1 J_2} + w^2}} \quad (5)$$

Incidentally, $M_{f0w}$ may not be calculated by the equation (4), and may be calculated by regarding the motor system 5 as a higher-order system.

Next, the shaft coupling characteristic evaluation unit 34 calculates the coefficient of viscosity $c_c$ based on the following equation (6) by using the torsional rigidity $K_c$, the converted velocity response parameter $M_{f0}$, and the moments of inertia $J_1$ and $J_2$.

$$c_c = \sqrt{\frac{K_c J_2^4}{K_c(J_1+J_2)^4 M_{f0}^2 - J_1 J_2 (J_1+J_2)}} \quad (6)$$

Incidentally, the equation (6) is acquired by modeling a state where the shaft coupling 4 connects the drive shaft 2 and the driven shaft 3 by using a vibration model of FIG. 7 so as to express the state as the block diagram (FIG. 8) and calculating the transfer function G(s) from the drive torque $T_m$ generated by the drive motor 11 to the angular velocity ω. Incidentally, the transfer function G(s) is given by the following equation (7).

$$G(s) = \frac{J_2 s^2 + C_c s + K_c}{J_1 J_2 s^3 + (J_1+J_2)C_c s^2 + (J_1+J_2)K_c s} \quad (7)$$

Further, by using the equation (7), the velocity response parameter $M_{f0}$ ($^{exp}M_{f0}$) at the resonance frequency $f_0$ is expressed as the equation (8).

$$M_{f0} = \frac{\sqrt{\frac{(J_1+J_2)^4}{J_1^4}K_c^4 c_c^2 + \frac{(J_1+J_2)^5}{J_1^3 J_2^3}K_c^3 c_c^4}}{\frac{(J_1+J_2)^4}{J_1^2 J_2^2}K_c^2 c_c^2} \quad (8)$$

The above the equation (6) can be acquired by solving the equation (8) with respect to the coefficient of viscosity $c_c$.

Figure 8:
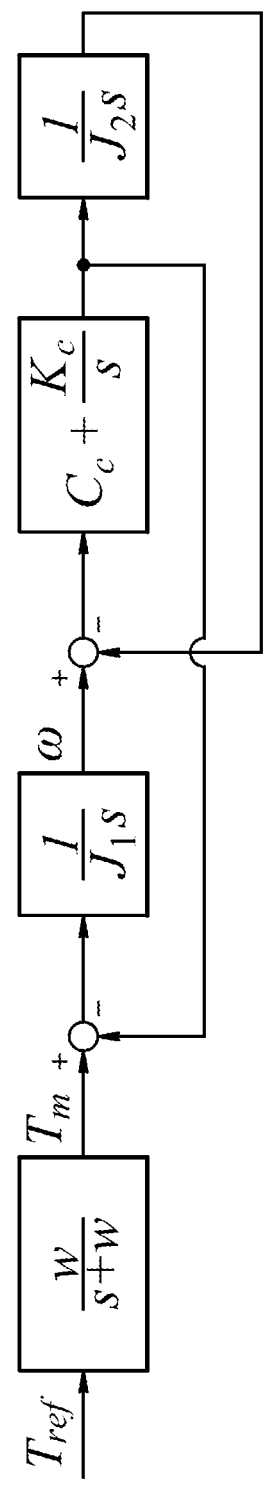
FIG. 8 is a block diagram showing a state where the shaft coupling connects the drive shaft and the driven shaft.

The velocity response parameter $M_{f0}$ in the equation (8) is a velocity response parameter at the resonance frequency $f_0$ of the transfer function G(s) from the drive torque $T_m$ generated by the drive motor 11 to the angular velocity ω. Incidentally, as shown in FIGS. 1 and 8, at the time of measurement, the frequency response is acquired by outputting the torque command $T_{ref}$ and measuring the angular velocity ω. Accordingly, it is preferable to consider a delay from the time the torque command $T_{ref}$ is output to the time the drive torque $T_m$ is generated by the drive motor 11, namely a delay of the motor system 5.

The velocity response parameter $M_{f0all}$ in a case where the motor system 5 is approximated as a first-order delay system can be expressed by the following equation (9).

$$M_{f0all} = \frac{w}{\sqrt{\frac{K_c(J_1+J_2)}{J_1 J_2} + w^2}} M_{f0} \equiv M_{f0w} M_{f0} \quad (9)$$

Incidentally, $M_{f0w}$ is calculated by deriving the transfer function G*(s) until when the drive motor 11 is driven according to the torque command $T_{ref}$ and generates the drive torque $T_m$ corresponding to the torque command $T_{ref}$. In a case where the motor system 5 is approximated as a first-order delay system, the transfer function G*(s) is given by the following equation (10). As shown in the equation (10), the transfer function G*(s) includes the response band w as a parameter.

$$G^*(s) = \frac{s}{s+w} \quad (10)$$

In a case where the motor system 5 can be approximated as a first-order delay system, the measured velocity response parameter $^{exp}M_{f0}$ becomes equal to $M_{f0all}$ (the following equation (11)).

$$^{exp}M_{f0} = M_{f0all} \quad (11)$$

In a case where the motor system 5 can be approximated as a first-order delay system, by substituting the equation (11) for the equation (9), it is possible to convert the measured velocity response parameter $^{exp}M_{f0}$ into the velocity response parameter $^{exp}M_{f0}$ in a case where the response band w is infinite (in a case where the delay period is zero), that is, in a case where the transfer function from the torque command $T_{ref}$ to the drive torque $T_m$ is one. As can be understood from the equations (9) and (11), the equation (4) corresponds to a conversion equation thereof.

Upon completing the calculation of the coefficient of viscosity $c_c$, the shaft coupling characteristic evaluation unit 34 causes the output device 28 to display the torsional rigidity $K_c$ and the coefficient of viscosity $c_c$.

When the user performs a prescribed input to the input/output device 8 so as to acquire the torsional rigidity $K_c$ and the coefficient of viscosity $c_c$ of the shaft coupling 4, the processor 21 of the analyzing device 7 executes an evaluation program so as to execute an evaluation method of the shaft coupling 4, and thus executes an evaluation process shown in the flowchart of FIG. 9. In the following, the details of the evaluation process will be described with reference to FIG. 9. Incidentally, it is assumed that the shaft coupling 4 is disconnected from the drive shaft 2 and the driven shaft 3 at the start of the evaluation process.

When the evaluation process is started, the frequency response acquiring unit 32 first acquires the frequency response (ST1). That is, the drive motor 11 is driven and the frequency response is acquired in a state where the shaft coupling 4 is disconnected from the drive shaft 2 and the driven shaft 3. After that, the motor system response acquiring unit 33 acquires the response characteristic of the motor system 5 by using the frequency response acquired in a state where the shaft coupling 4 is disconnected from the drive shaft 2 and the driven shaft 3 (ST2). More specifically, the motor system response acquiring unit 33 acquires the response band w, which is a parameter included in the transfer function G*(s) based on the frequency response in a state where the shaft coupling 4 is disconnected.

Upon completing the acquisition of the response band w, the processor 21 causes the output device 28 to display a screen urging that the shaft coupling 4 be connected to the drive shaft 2 and the driven shaft 3, and causes the input device 27 to receive the input of the moment of inertia $J_c$ of the shaft coupling 4 to be evaluated (ST3). After that, the processor 21 determines whether the user inputs the moment of inertia $J_c$ of the shaft coupling 4 to the input device 27 (ST4). In a case where there is an input by the user, the frequency response acquiring unit 32 acquires the frequency response (ST5). That is, the frequency response is acquired in a state where the shaft coupling 4 is connected. In a case where there is no input by the user, the frequency response acquiring unit 32 waits until the user performs, to the input device 27, an input indicating that the connection of the shaft coupling 4 is completed.

When the frequency response is acquired in a state where the shaft coupling 4 is connected, the shaft coupling characteristic evaluation unit 34 acquires the resonance frequency $f_0$ of the shaft coupling 4 and the gain $G_{f0}$ (gain $^{exp}G_{f0}$) at the resonance frequency $f_0$ based on the frequency response in a state where the shaft coupling 4 is connected (ST6).

Next, the shaft coupling characteristic evaluation unit 34 calculates the torsional rigidity $K_c$ of the shaft coupling 4 from the resonance frequency $f_0$ based on the equation (1) (ST7). After that, the shaft coupling characteristic evaluation unit 34 calculates the velocity response parameter $^{exp}M_{f0}$ based on the equation (3) by using the gain $^{exp}G_{f0}$ at the resonance frequency $f_0$ (ST8). Further, the shaft coupling characteristic evaluation unit 34 converts the calculated velocity response parameter $^{exp}M_{f0}$ into the converted velocity response parameter $M_{f0}$ corresponding thereto by using the response band w (ST9). After that, the shaft coupling characteristic evaluation unit 34 calculates the coefficient of viscosity $c_c$ of the shaft coupling 4 from the torsional rigidity $K_c$ and the converted velocity response parameter $M_{f0}$ based on the equation (5). Upon completing the calculation of the coefficient of viscosity $c_c$ of the shaft coupling 4, the shaft coupling characteristic evaluation unit 34 causes the output device 28 to display the calculated torsional rigidity $K_c$ and the calculated coefficient of viscosity $c_c$ (ST10).

Upon completing the display of the torsional rigidity $K_c$ and the coefficient of viscosity $c_c$, the processor 21 ends the evaluation process.

Figure 4:
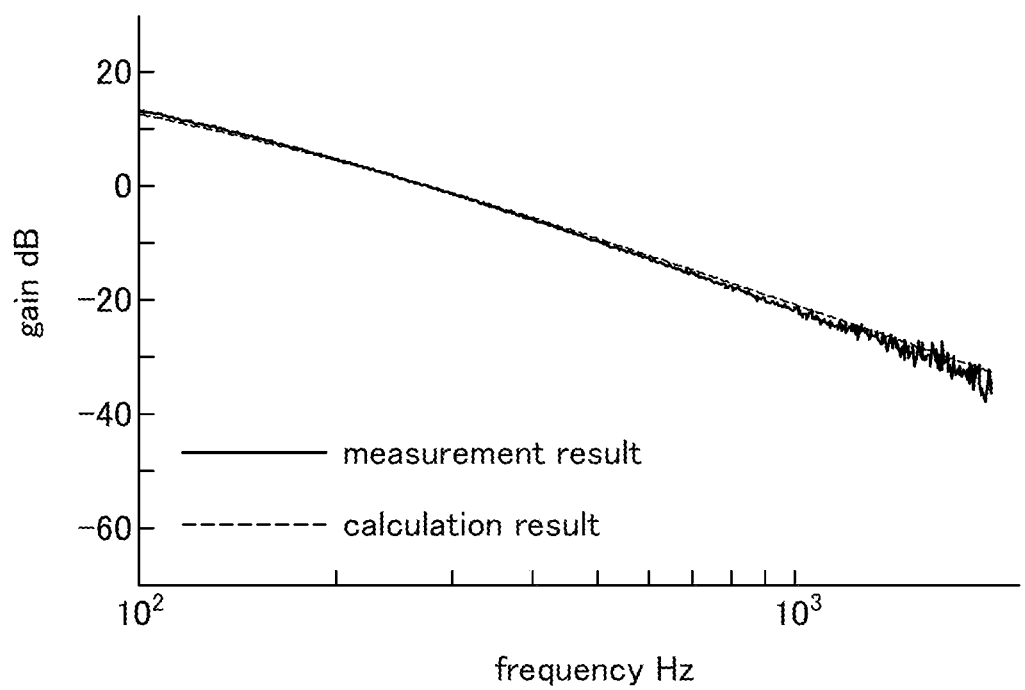
FIG. 4 is a graph showing a frequency response acquired at the time the shaft coupling is disconnected.
Figure 5:
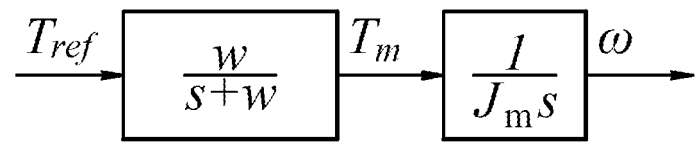
FIG. 5 is a block diagram showing a state where the shaft coupling is disconnected.

Next, the operation of the characteristic evaluation device 1 according to the present embodiment will be described as for an example where a prescribed shaft coupling A is evaluated. When the user starts the evaluation process, the frequency response is first acquired in a state where the shaft coupling 4 is disconnected from the drive shaft 2 and the driven shaft 3 (ST1). In FIG. 4, the frequency response acquired (measured) at this time is shown by a solid line. After that, the motor system response acquiring unit 33 calculates the response band w by fitting, with the acquired frequency response, the transfer function corresponding to the block diagram corresponding to a state where the shaft coupling 4 is disconnected by a least squares method, thereby acquiring the transfer function G*(s) (ST2). When the transfer function corresponding to the frequency response calculated based on the block diagram shown in FIG. 5 is fitted with the frequency response shown in FIG. 4, the response band w is calculated at 1200 rad/s. (up to 191 Hz at the cutoff frequency). In FIG. 4, the frequency response calculated by using the calculated response band w is shown by a broken line. As shown by the broken line in FIG. 4, the frequency response in a state where the shaft coupling 4 is disconnected can be reproduced by the theoretically calculated response band w. Accordingly, it is assumed that the motor system 5 is sufficiently approximated as a first-order delay system and the response band w is calculated accurately. Further, in FIG. 4, it is confirmed that the measured gain G is gently bent in the vicinity of the cutoff frequency (w/2π) corresponding to the response band w.

Figure 10A:
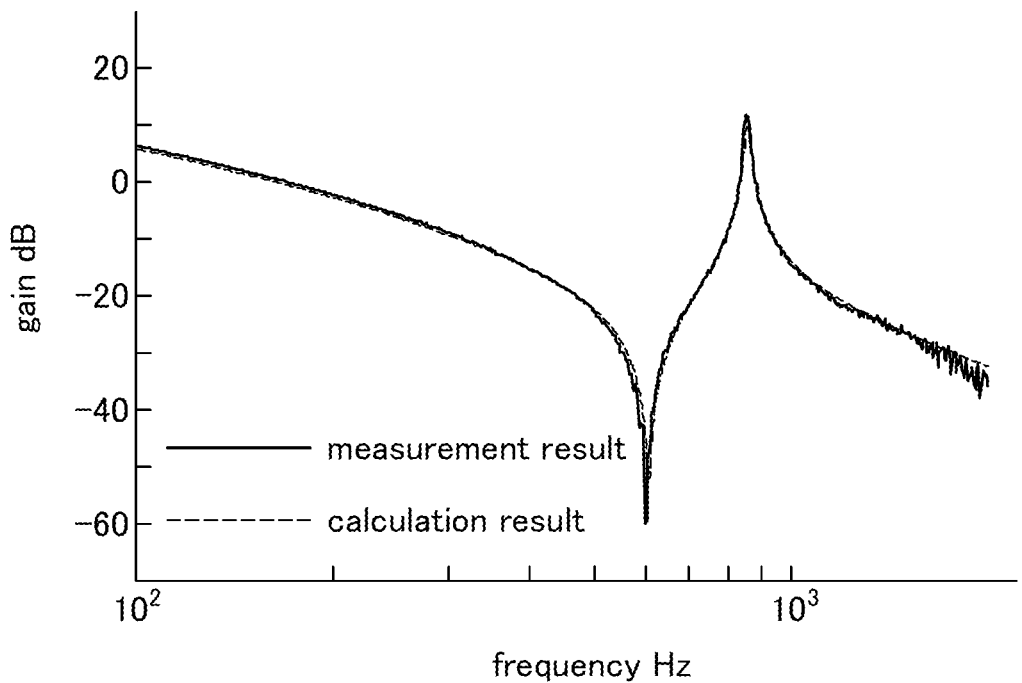
FIG. 10A is a graph showing a measurement result (shown by a solid line) the frequency response and a calculation result (shown by a broken line) in consideration of a response characteristic of a motor system in a state where a shaft coupling A connects the drive shaft and the driven shaft.

After that, the output device 28 displays a screen urging that the shaft coupling 4 be connected, and receives an input of the moment of inertia $J_c$ of the shaft coupling 4 (ST3). When the user connects the shaft coupling 4 to be evaluated and inputs the moment of inertia $J_c$ of the shaft coupling 4 (ST4), the frequency response is acquired in a state where the shaft coupling 4 connects the drive shaft 2 and the driven shaft 3 (ST5). FIG. 10A shows a measurement result of the frequency response in a state where the shaft coupling A connects the drive shaft 2 and the driven shaft 3.

Next, the shaft coupling characteristic evaluation unit 34 acquires the resonance frequency $f_0$ and the gain $^{exp}G_{f0}$ at the resonance frequency $f_0$ from the frequency response acquired in a state where the shaft coupling 4 connects the drive shaft 2 and the driven shaft 3 (ST6). After that, the shaft coupling characteristic evaluation unit 34 calculates the torsional rigidity $K_c$ of the shaft coupling 4 by using the resonance frequency $f_0$ (ST7), and calculates the velocity response parameter $^{exp}M_{f0}$ from the gain $^{exp}G_{f0}$ at the resonance frequency $f_0$ (ST8). Further, the shaft coupling characteristic evaluation unit 34 converts the velocity response parameter $^{exp}M_{f0}$ into the converted velocity response parameter $M_{f0}$ by using the response band w (ST9), and then calculates the coefficient of viscosity $c_c$ (ST10).

As for the shaft coupling A, the torsional rigidity $K_c$ is calculated as 5026 Nm/rad and the coefficient of viscosity $c_c$ is calculated as 0.0142 Nm/(rad/s) based on the frequency response shown in FIG. 10A. When the calculation is completed and the torsional rigidity $K_c$ and the coefficient of viscosity $c_c$ are displayed, the evaluation process is completed.

Figure 10B:
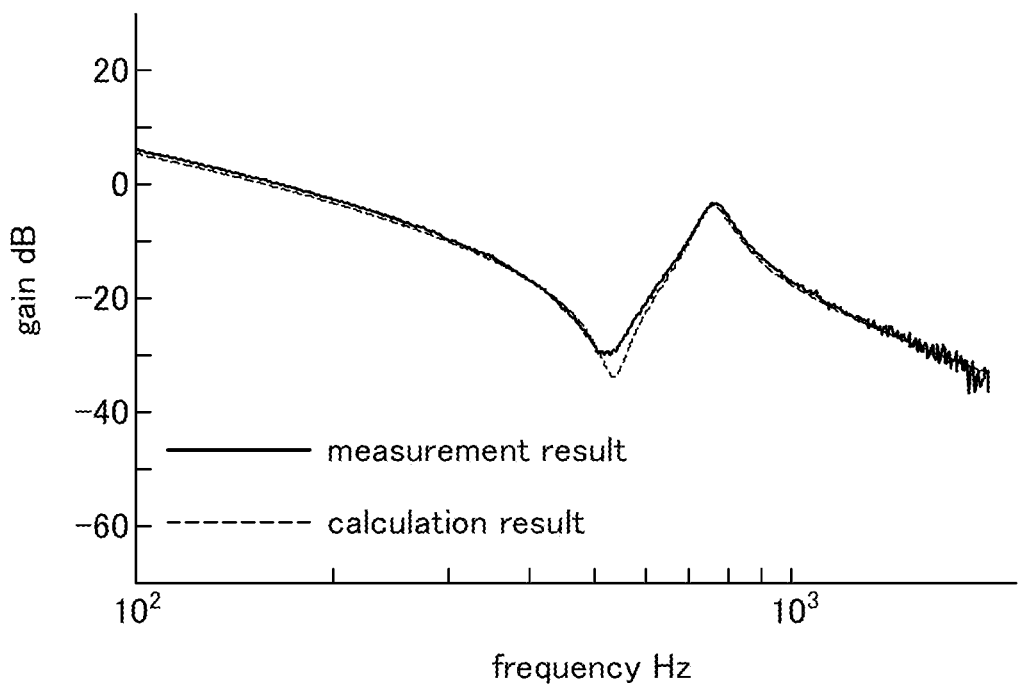
FIG. 10B is a graph showing a measurement result (shown by a solid line) of the frequency response and a calculation result (shown by a broken line) in consideration of the response characteristic of the motor system in a state where a shaft coupling B connects the drive shaft and the driven shaft.

FIG. 10B shows a measurement result of the frequency response at the time the characteristics of the shaft coupling B different from the shaft coupling A are evaluated in the same manner. As for the shaft coupling B, the torsional rigidity $K_c$ is calculated as 5026 Nm/rad and the coefficient of viscosity $c_c$ is calculated as 0.0142 Nm/(rad/s) based on the frequency response shown in FIG. 10B.

The response band w is not affected by the rotational load or the shaft coupling 4 for evaluation. Accordingly, when the characteristics of the shaft coupling B are evaluated after the characteristics of the shaft coupling A are evaluated, the evaluation process may be started from step ST3. In this way, the value of the response band w once determined in the test of one shaft coupling 4 can be used as it is in the test of another shaft coupling 4.

In FIG. 10A, the frequency response calculated by using the calculated torsional rigidity $K_c$ is shown by a broken line. In FIG. 10B, the frequency response calculated by using the calculated coefficient of viscosity $c_c$ is shown by a broken line. As shown in FIGS. 10A and 10B, the frequency response calculated by using the torsional rigidity $K_c$ and the coefficient of viscosity $c_c$ sufficiently matches the frequency response acquired by the measurement (frequency response acquired in step ST1).

Next, the effect of the characteristic evaluation device 1 according to the present embodiment will be described. In general, the motor system 5 has a prescribed response characteristic. Accordingly, in a case where the torque command $T_{ref}$ is input thereto, the drive torque $T_m$ that matches the torque command $T_{ref}$ is not applied to the drive shaft 2 immediately. For example, there is a prescribed delay from the time the torque command $T_{ref}$ is input thereto to the time the drive torque $T_m$ is generated, and it takes a prescribed period (namely, the delay period) until the time the drive torque $T_m$ applied to the drive shaft 2 matches the torque command $T_{ref}$. In such a case, the drive torque $T_m$ applied to the drive shaft 2 is smaller than the torque (namely, the torque in a case where it is assumed that the transfer function from the torque command $T_{ref}$ to the drive torque $T_m$ is one) corresponding to the torque command $T_{ref}$ especially at the frequency equal to or higher than the cutoff frequency. That is, especially in the frequency band higher than the cutoff frequency, the gain acquired based on the measurement by using the motor system 5 becomes smaller than the gain presumed based on a model in disregard of the response characteristic of the motor system 5, namely, a model in which the transfer function from the torque command $T_{ref}$ to the drive torque $T_m$ is one and the drive torque $T_m$ that matches the torque command $T_{ref}$ is generated immediately after the torque command $T_{ref}$ is input. Accordingly, when the physical parameter is calculated by using a model in disregard of the response characteristic of the motor system 5 based on the frequency response measured in a state where the shaft coupling 4 is connected, the calculated physical parameter may differ from the original value (namely, an actual value) of the physical parameter of the shaft coupling 4. In particular, as shown in FIGS. 10A and 10B, in a case where the resonance frequency $f_0$ is larger than the response band w (191 Hz), it is assumed that the deviation of the calculated physical parameter from the actual value increases when the physical parameter is calculated by using a model in disregard of the response characteristic of the motor system 5.

To consider the influence of the response characteristic of the motor system 5 on the evaluation of the physical parameter, the torsional rigidity $K_c$ and the coefficient of viscosity $c_c$ have been calculated in disregard of the response characteristic of the motor system 5 with respect to the frequency response (see FIG. 10A) acquired in a state where the shaft coupling A is connected. More specifically, the measured velocity response parameter $^{exp}M_{f0}$ is regarded as $M_{f0}$ and put into the equation (5), and thus the torsional rigidity $K_c$ and the coefficient of viscosity $c_c$ have been acquired. The acquired torsional rigidity $K_c$ and the acquired coefficient of viscosity $c_c$ are 5026 Nm/rad and 0.0380 Nm/(rad/s), respectively.

Figure 11:
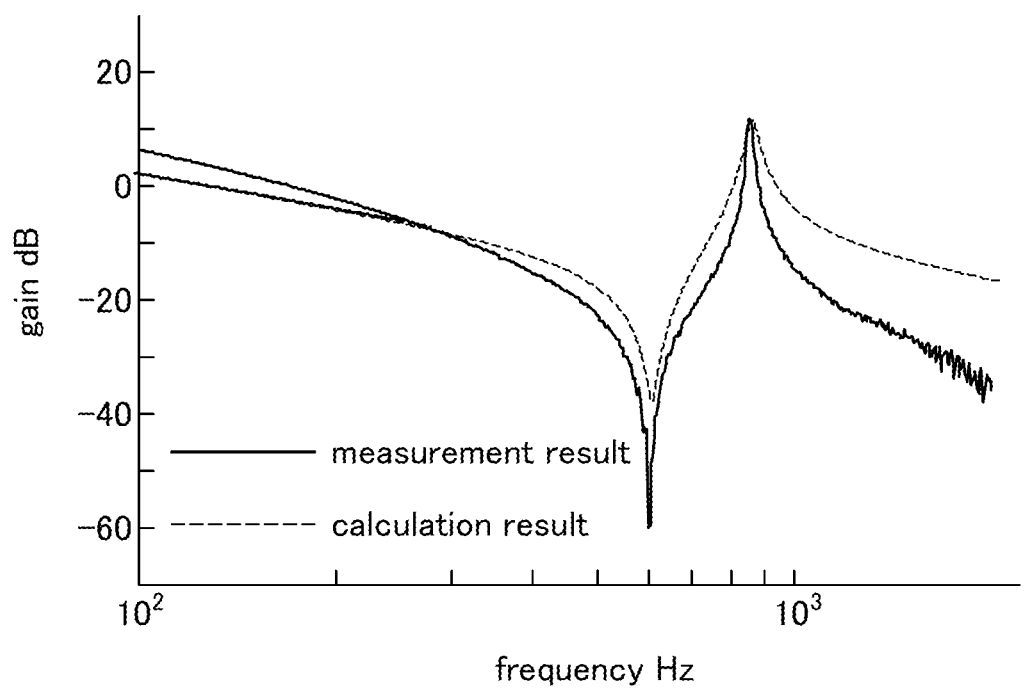
FIG. 11 is a graph showing a measurement result (shown by a solid line) of the frequency response and a calculation result (shown by a broken line) in disregard of a delay of the motor system in a state where the shaft coupling A connects the drive shaft and the driven shaft.

In FIG. 11, the frequency response acquired (measured) in a state where the shaft coupling A is connected is shown by a solid line, and the frequency response calculated by using the torsional rigidity $K_c$ and the coefficient of viscosity $c_c$ acquired in disregard of the response characteristic of the motor system 5 is shown by a two-dot chain line. In FIG. 11, the measured frequency response (solid line) and the calculated frequency response (broken line) are deviated from each other as compared with FIG. 10A. That is, as shown in FIG. 10A, it is confirmed that the characteristic evaluation device 1 according to the present embodiment can reproduce the frequency response measured accurately by calculation (simulation), and thus the identified physical parameter of the shaft coupling 4 is close to the actual value. That is, by using the characteristic evaluation device 1, it is possible to calculate the characteristics of the shaft coupling 4 in consideration of the response characteristic until the drive motor 11 generates the drive torque $T_m$ after the torque command $T_{ref}$ is given to the motor, and thus to more properly evaluate the characteristics of the shaft coupling 4.

In this way, by using the characteristic evaluation device 1 (characteristic evaluation method) according to the present embodiment, it is possible to acquire the torsional rigidity $K_c$ and the coefficient of viscosity $c_c$ of the shaft coupling 4 and test the characteristics of the shaft coupling 4. Furthermore, by changing the input torque command $T_{ref}$ and evaluating characteristics of the shaft coupling 4 while changing the amplitude of the torque output from the drive motor 11, it is possible to clarify how the characteristics of the shaft coupling 4 change depending on the use state thereof. Further, the characteristics of the mechanical device in which the shaft coupling 4 is mounted can be simulated more accurately by using the torsional rigidity $K_c$ and the coefficient of viscosity $c_c$ of the shaft coupling 4 acquired by the characteristic evaluation device 1.

Further, the value of the response band w once determined for one shaft coupling 4 can be used as it is for a test of another shaft coupling 4. Accordingly, it is not necessary to acquire the response band w every time the shaft coupling 4 is replaced, so that the characteristics of plural shaft couplings 4 can be evaluated more quickly.

The Second Embodiment

Figure 12:
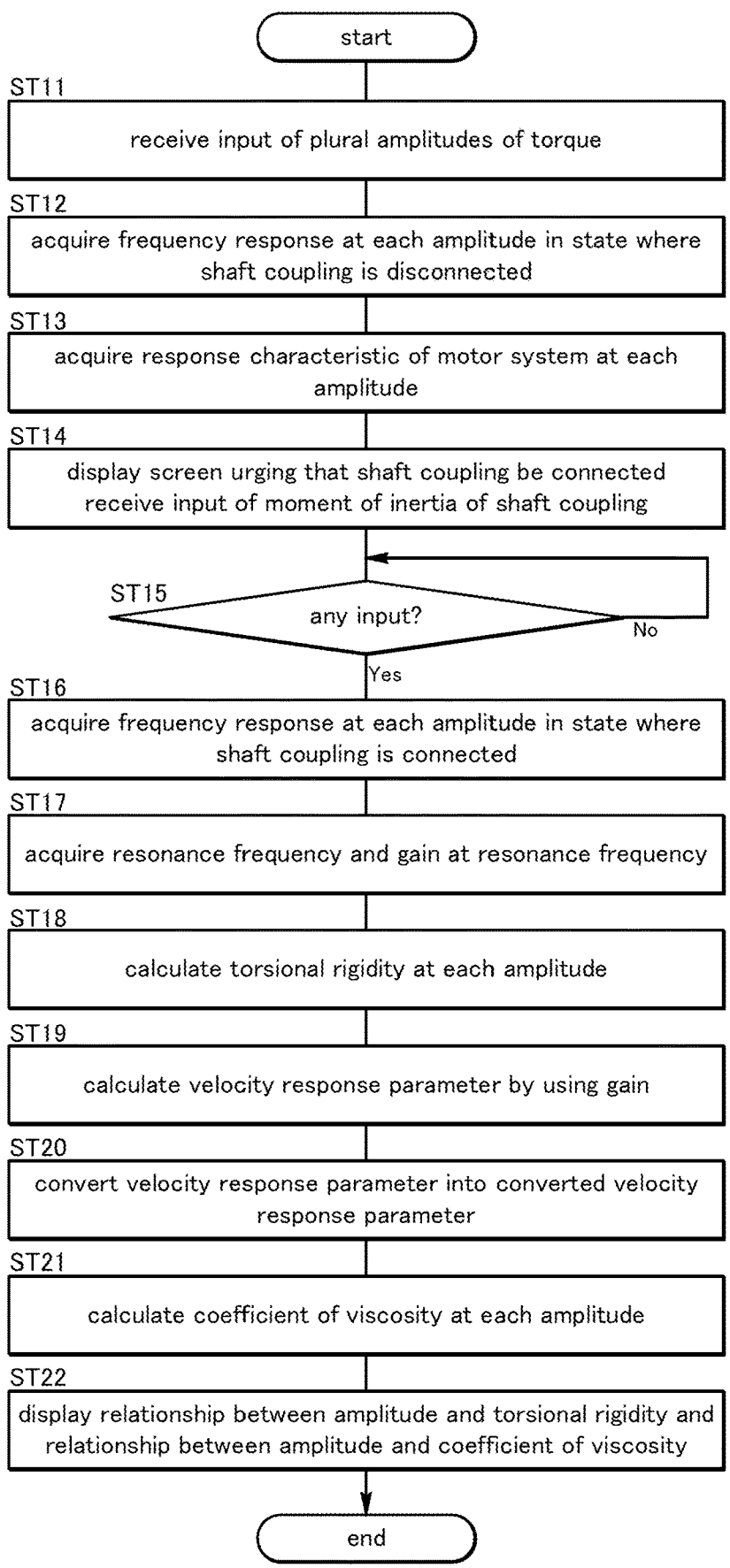
FIG. 12 is a flowchart of an evaluation process according to the second embodiment.

A characteristic evaluation device 101 according to the second embodiment is configured to acquire the dependency of the torsional rigidity $K_c$ of the shaft coupling 4 on the amplitude of the torque command $T_{ref}$ and the dependency of the coefficient of viscosity $c_c$ of the shaft coupling 4 on the amplitude of the torque command $T_{ref}$. The processor 21 of the characteristic evaluation device 101 according to the second embodiment is configured to execute the evaluation program different from the first embodiment and the evaluation process different from the first embodiment so as to acquire the abovementioned dependency on the amplitude. In the following, the details of the evaluation process will be described with reference to FIG. 12. Incidentally, like the first embodiment, it is assumed that the shaft coupling 4 is disconnected from the drive shaft 2 and the driven shaft 3 at the start of the evaluation process.

When the evaluation process is started, the processor 21 causes the input/output device 8 to receive an input of plural amplitudes of torque to give an output instruction to the servo driver 13 (ST11). At this time, in a case where the upper and lower limits of the amplitudes and the value of the amplitude to be set are input to the input/output device 8, the processor 21 may receive the input of the plural amplitudes of torque to give the output instruction by dividing the interval between the upper and lower limits based on the value of the amplitude.

Next, the frequency response acquiring unit 32 outputs the torque command $T_{ref}$ to the servo driver 13 so as to output the torque that vibrates with the received amplitudes while changing the frequency, and acquires the frequency response at each amplitude (ST12). That is, the drive motor 11 is driven in a state where the shaft coupling 4 is disconnected from the drive shaft 2 and the driven shaft 3, and the frequency response at each amplitude is acquired. After that, the motor system response acquiring unit 33 acquires the response characteristic of the motor system 5 at each amplitude by using the frequency response acquired in a state where the shaft coupling 4 is disconnected from the drive shaft 2 and the driven shaft 3 (ST13). More specifically, in a state where the shaft coupling 4 is disconnected, the motor system response acquiring unit 33 acquires the response band w, which is a parameter included in the transfer function $G^*(s)$, based on the frequency response at each amplitude.

Upon completing the acquisition of the response band w, the processor 21 causes the output device 28 to display a screen urging that the shaft coupling 4 be connected to the drive shaft 2 and the driven shaft 3, and causes the input device 27 to receive the input of the moment of inertia $J_c$ of the shaft coupling 4 to be evaluated (ST14). After that, the processor 21 determines whether the user inputs the moment of inertia $J_c$ of the shaft coupling 4 to the input device 27 (ST15).

In a case where there is an input of the moment of inertia $J_c$, the frequency response acquiring unit 32 outputs the torque command $T_{ref}$ so as to output the torque that vibrates at each input amplitude while changing the frequency, and acquires the frequency response at each amplitude (ST16). That is, the frequency response at each amplitude is acquired in a state where the shaft coupling 4 is connected. In a case where there is no input, the frequency response acquiring unit 32 waits until the user performs, to the input device 27, an input indicating that the connection of the shall coupling 4 is completed.

When the frequency response at each input amplitude is acquired in a state where the shaft coupling 4 is connected, the shaft coupling characteristic evaluation unit 34 acquires the resonance frequency $f_0$ of the shaft coupling 4 and the gain $G_{f0}$ (gain $^{exp}G_{f0}$) at the resonance frequency $f_0$ at each amplitude based on the frequency response at each amplitude in a state where the shaft coupling 4 is connected (ST17).

Next, the shaft coupling characteristic evaluation unit 34 calculates the torsional rigidity $K_c$ of the shaft coupling 4 at each amplitude by using the resonance frequency $f_0$ at each amplitude and the equation (1) (ST18). After that, the shaft coupling characteristic evaluation unit 34 calculates the velocity response parameter $^{exp}M_{f0}$ at each amplitude based on the equation (3) by using the gain $^{exp}G_{f0}$ at the resonance frequency $f_0$ (ST19).

Figure 14A:
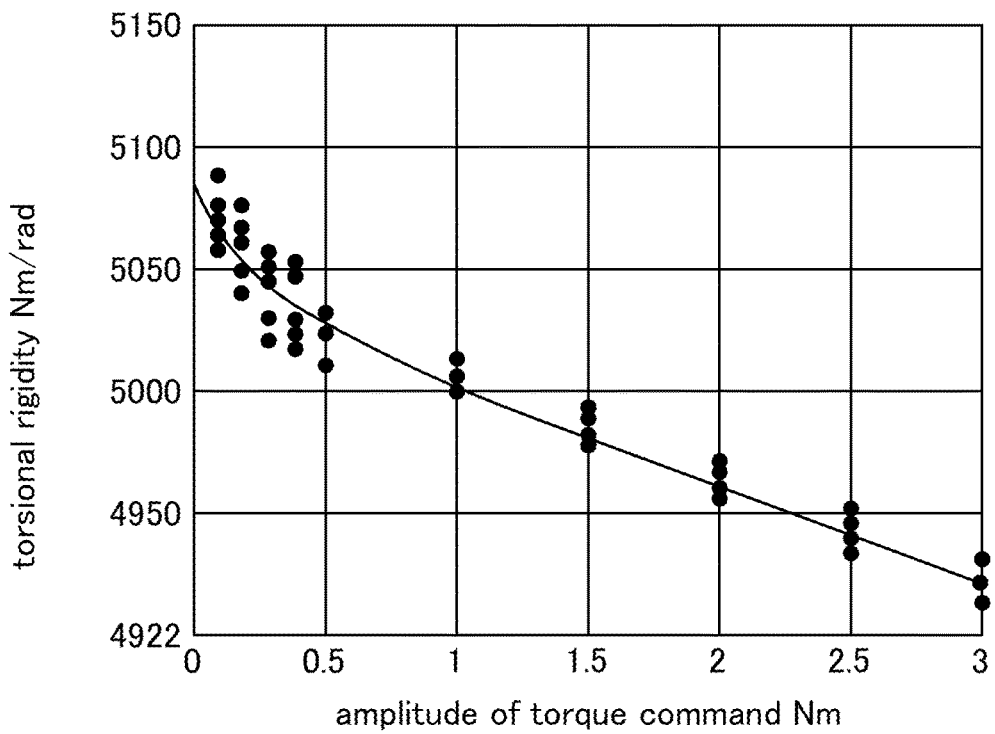
FIG. 14A is a graph showing a relationship between a torsional rigidity and an amplitude of a torque command acquired from the frequency response and changed in ten ways in a state where: the shaft coupling A connects the drive shaft and the driven shaft.
Figure 14B:
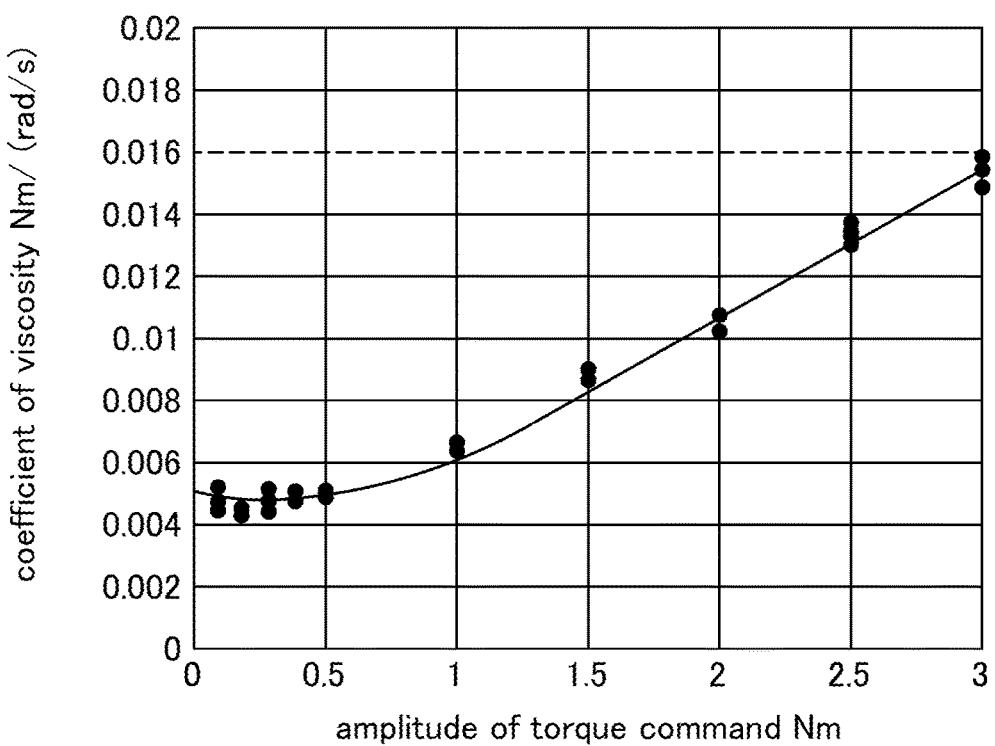
FIG. 14B is a graph showing a relationship between a coefficient of viscosity and the amplitude of the torque command acquired from the frequency response and changed in ten ways in a state where the shaft coupling A connects the drive shaft and the driven shaft.

Further, the shaft coupling characteristic evaluation unit 34 converts the velocity response parameter $^{exp}M_{f0}$ calculated at each amplitude into the converted velocity response parameter $M_{fo}$ at each amplitude by using the response hand w (ST20). After that, the shaft coupling characteristic evaluation unit 34 calculates the coefficient of viscosity $c_c$ of the shaft coupling 4 at each amplitude based on the equation (5) by using the torsional rigidity $K_c$ and the converted velocity response parameter $M_{fo}$ at each amplitude (ST21). Upon completing the calculation of the coefficient of viscosity $c_c$ of the shaft coupling 4, the shaft coupling characteristic evaluation unit 34 causes the output device 28 to display a relationship between the amplitude of the torque command $T_{ref}$ and the torsional rigidity $K_c$ and a relationship between the amplitude of the torque command $T_{ref}$ and the coefficient of viscosity $c_c$ (ST22). At this time, as shown in FIGS. 14A and 14B, the shaft coupling characteristic evaluation unit 34 may cause the input/output device 8 to display the dependency of the torsional rigidity $K_c$ and the coefficient of viscosity $c_c$ on the amplitude of the torque command $T_{ref}$ by using graphs.

When the display of the dependency of the torsional rigidity $K_c$ and the coefficient of viscosity cc on the amplitude is completed, the processor 21 ends the evaluation process.

Next, the effect of the characteristic evaluation device 101 configured in this way will be described. The processor 21 of the characteristic evaluation device 101 of the shaft coupling 4 according to the present embodiment outputs the torque command $T_{ref}$ to the servo driver 13 (motor control unit) so as to output the drive torque $T_m$ of plural amplitudes in a state where the shaft coupling 4 connects the drive shaft 2 and the driven shaft 3, and calculates the frequency response corresponding to each amplitude. The processor 21 calculates the characteristics of the shaft coupling 4 corresponding to each amplitude based on the response characteristic of the motor system 5 and the calculated frequency response. More specifically, the processor 21 calculates the torsional rigidity $K_c$ and the coefficient of viscosity $c_c$ of the shaft coupling 4 with respect to the frequency response corresponding to each acquired amplitude, and outputs the relationship between the amplitude and the torsional rigidity $K_c$ of the shaft coupling 4 and the relationship between the amplitude and the coefficient of viscosity $c_c$ of the shaft coupling 4 by using graphs.

Figure 13A:
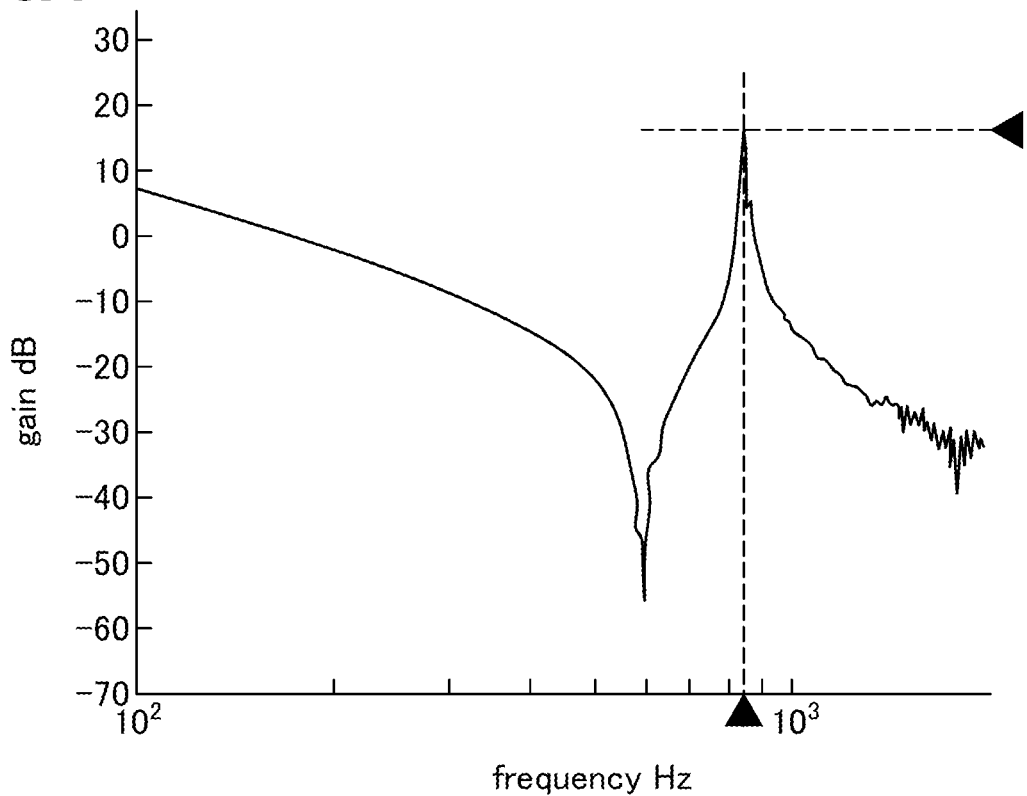
FIG. 13A is a graph showing the frequency response in a case where the shaft coupling A connects the drive shaft and the driven shaft and the amplitude of the torque command is set to 1.0 Nm.
Figure 13B:
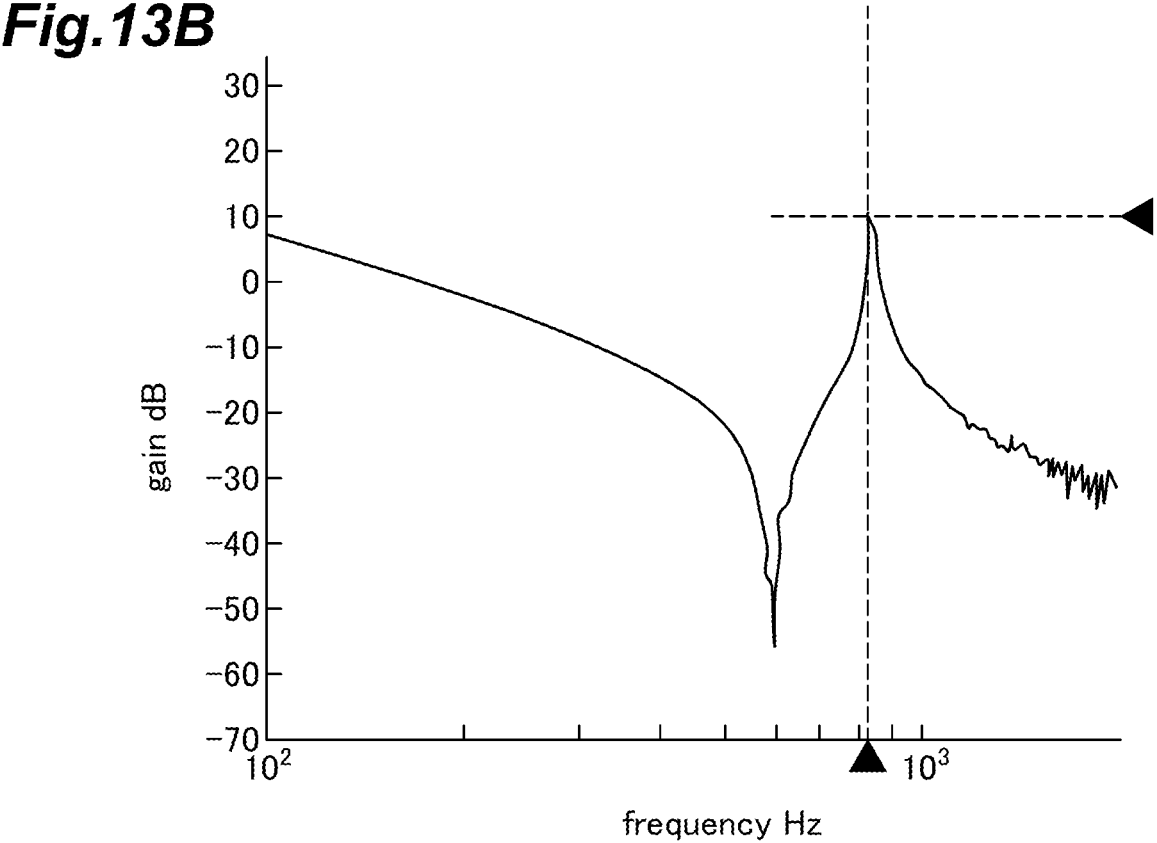
FIG. 13B is a graph showing the frequency response in a case where the shaft coupling A connects the drive shaft and the driven shaft and the amplitude of the torque command is set to 3.0 Nm.

FIG. 13A shows the frequency response of the gain of the shaft coupling A in a case where the amplitude of the torque command $T_{ref}$ is set to 1.0 Nm, and FIG. 13B shows the frequency response of the gain of the shaft coupling A in a case where the amplitude of the torque command $T_{ref}$ is set to 3.0 Nm. In FIGS. 13A and 13B, there is a slight difference in the measurement result of the frequency response depending on the amplitude of the torque command $T_{ref}$. More specifically, as shown by the triangles in FIGS. 13A and 13B, the gain at the resonance frequency $f_0$ near 800 Hz becomes smaller in a case where the amplitude of the torque command $T_{ref}$ is set to 3.0 Nm. It is possible to evaluate the relationship between the amplitude of the torque command $T_{ref}$ and the torsional rigidity $K_c$ and the relationship between the amplitude of the torque command $T_{ref}$ the coefficient of viscosity $c_c$ by measuring the frequency response while changing the setting of the amplitude of the torque command $T_{ref}$ and acquiring the torsional rigidity $K_c$ and the coefficient of viscosity $c_c$ of the shaft coupling A at each amplitude of the torque command $T_{ref}$ based on the measurement result thereof.

FIGS. 14A and 14B show graphs in a case of measuring the frequency response of the gain of the shaft coupling A while changing the amplitude of the torque command $T_{ref}$ in ten ways and acquiring the torsional rigidity $K_c$ and the coefficient of viscosity $c_c$ of the shaft coupling A at each amplitude of torque based on the frequency response. In FIG. 14A, the amplitude of the torque command $T_{ref}$ is set to the horizontal axis, and the torsional rigidity $K_c$ is set to the vertical axis. In FIG. 14B, the amplitude of the torque command $T_{ref}$ is set to the horizontal axis, and the coefficient of viscosity $c_c$ is set to the vertical axis. In FIGS. 14A and 14B, the same measurement is executed five times at each amplitude set by the torque command $T_{ref}$ so that accurate values can be acquired. Solid lines in FIGS. 14A and 14B are approximate curves showing the tendency of change.

As shown in FIGS. 14A and 14B, the shaft coupling A has a tendency that the torsional rigidity $K_c$ decrease and the coefficient of viscosity $c_c$ increase as the amplitude of the torque command $T_{ref}$ increases. In this way, by understanding the tendency of the change depending on the amplitude of the torque command $T_{ref}$, it is possible to properly evaluate the dependency of the characteristics of the shaft coupling 4 on the input, and thus it is possible to presume the vibration characteristic under various driving conditions and design an appropriate control system.

In the present embodiment, it is possible to output the dependency of the torsional rigidity $K_c$ of the shaft coupling 4 on the amplitude of the torque command $T_{ref}$ and the dependency of the coefficient of viscosity $c_c$ on the amplitude of the torque command $T_{ref}$. Accordingly, it is possible to properly evaluate the dependency of the shaft coupling 4 on the input. Further, it is possible to output the dependency of the characteristics of the shaft coupling 4 on the amplitude of the torque command $T_{ref}$ as the dependency of the torsional rigidity $K_c$ and the coefficient of viscosity $c_c$ on the amplitude, so that the output contents can be easily understood by the user and the characteristic evaluation device 101 of the shaft coupling 4 can be more convenient.

The present invention has been described above based on specific embodiments, but these embodiments are merely examples, and the present invention is not limited to these embodiments. Not all of the components of the evaluation method and the evaluation program are indispensable, and can be appropriately selected within the scope of the present invention.

In the second embodiment, the horizontal axis of the graph is set to the amplitude of the torque command $T_{ref}$. However, the present invention is not limited to this embodiment. The horizontal axis of the graph may be set to at least one of the amplitude of the torque command $T_{ref}$, an amplitude of the drive torque $T_m$ at the resonance frequency $f_0$, an amplitude of the rotation angle of the motor shaft (drive shaft 2) at the resonance frequency $f_0$, and an amplitude of the angular velocity $\omega$ of the motor shaft (drive shaft 2) at the resonance frequency $f_0$.

When the amplitude of the rotation angle of the motor shaft (drive shaft 2) at the resonance frequency $f_0$ or the amplitude of the angular velocity $\omega$ of the motor shaft (drive shaft 2) at the resonance frequency $f_0$ is set to the horizontal axis, the resonance frequency $f_0$ may be acquired in advance by the measurement, designs, or the like with respect to the shaft coupling 4 to be measured, or acquired based on the frequency response acquired with respect to the prescribed torque command $T_{ref}$. Alternatively, the resonance frequency $f_0$ may be acquired by using the frequency response acquired with respect to each torque command $T_{ref}$, and the amplitude of the rotation angle or the amplitude of the angular velocity $\omega$ corresponding to the abovementioned resonance frequency $f_0$ may be set to the horizontal axis.

The frequency response at each amplitude of the torque command $T_{ref}$ may be measured plural times or only once. In a case where the frequency response is measured plural times, the repeatability of the results can be also evaluated.

In the abovementioned second embodiment, in step ST12, the frequency response at each amplitude of the input torque command $T_{ref}$ is acquired in a state where the shaft coupling 4 is disconnected from the drive shaft 2 and the driven shaft 3. However, the present invention is not limited to this embodiment. More specifically, in a case where the change in the frequency response depending on the amplitude of the torque command $T_{ref}$ is small in a state where the shaft coupling 4 is disconnected from the drive shaft 2 and the driven shaft 3, the frequency response at each amplitude of the input torque command $T_{ref}$ may be substituted by the frequency response acquired at one prescribed amplitude, and thus the process after step ST12 may be executed.

In the second embodiment, the shaft coupling characteristic evaluation unit 34 causes the input/output device 8 to display the dependency of the torsional rigidity $K_c$ and the coefficient of viscosity $c_c$ on the amplitude of the torque command $T_{ref}$ by using graphs. However, the present invention is not limited to this embodiment. The shaft coupling characteristic evaluation unit 34 may cause the input/output device 8 to display the relationship between the amplitude of the torque command $T_{ref}$ and the torsional rigidity $K_c$ or the relationship between the amplitude of the torque command $T_{ref}$ and the coefficient of viscosity $c_c$ by using a table, a function, or the like.

GLOSSARY OF TERMS

1: characteristic evaluation device according to the first embodiment
2: drive shaft
3: driven shaft
4: shaft coupling
5: motor system
6: driven device
7: analyzing device
8: input/output device
11: drive motor
12: electric current sensor
13: servo drive (motor control unit)
14: rotation angle sensor
15: differentiator
16: servo system
18: rotational load
21: processor
22: memory
23: RAM
24: ROM
25: storage device
26: input/output port
27: input device
28: output device
31: storage unit
32: frequency response acquiring unit
33: motor system response acquiring unit
34: shaft coupling characteristic evaluation unit
101: characteristic evaluation device according to the second embodiment
G*(s): transfer function
$K_c$: torsional rigidity
$M_{f_0}$: converted velocity response parameter (converted value)
$T_m$: drive torque
$c_c$: coefficient of viscosity
$f_0$: resonance frequency
w: response band
$\omega$: angular velocity

The invention claimed is:

1. A characteristic evaluation device of a shaft coupling for evaluating a characteristic of the shaft coupling configured to connect a drive shaft and a driven shaft so as to transmit torque from the drive shaft to the driven shaft, the characteristic evaluation device comprising:
a motor system including a drive motor configured to apply drive torque to the drive shaft, a rotation angle sensor configured to acquire a rotation angle of the drive shaft, and a motor control unit configured to control the drive motor based on a given torque command so as to cause the drive motor to output torque corresponding to the torque command;
a rotational load connected to the driven shaft; and
a processor configured to output the torque command to the motor control unit so as to output the drive torque of a prescribed value and configured to calculate a frequency response of a gain of an amplitude of an angular velocity of the rotation angle against an amplitude of the torque corresponding to the torque command based on the rotation angle detected by the rotation angle sensor,
wherein the processor is configured to calculate the characteristic of the shaft coupling based on a response characteristic of the motor system and the frequency response calculated in a state where the shaft coupling connects the drive shaft and the driven shaft.

2. The characteristic evaluation device according to claim 1, wherein the processor is configured to:
use, as the response characteristic of the motor system, a transfer function until when the drive motor is driven according to the torque command and generates the torque corresponding to the torque command,
acquire the frequency response in a state where the shaft coupling is connected,
acquire a resonance frequency of the shaft coupling and the gain at the resonance frequency based on the frequency response,
calculate a torsional rigidity of the shaft coupling by using the resonance frequency, and
calculate a coefficient of viscosity of the shaft coupling by using the transfer function, the torsional rigidity, and the gain at the resonance frequency.

3. The characteristic evaluation device according to claim 2, wherein the processor is configured to:
convert, by using the transfer function, the gain at the resonance frequency into a converted value corresponding to the gain at the resonance frequency in a case where the transfer function is one, and
calculate the coefficient of viscosity of the shaft coupling by using the torsional rigidity and the converted value.

4. The characteristic evaluation device according to claim 1, wherein the processor is configured to acquire the response characteristic of the motor system based on the frequency response at a time the drive motor is driven in a state where the shaft coupling is not connected to the drive shaft and the driven shaft.

5. The characteristic evaluation device according to claim 1, wherein the processor is configured to:
output the torque command to the motor control unit so as to output the drive torque of plural amplitudes in a state where the shaft coupling connects the drive shaft and the driven shaft,
calculate the frequency response corresponding to each amplitude,
calculate the characteristic of the shaft coupling corresponding to each amplitude based on the response characteristic of the motor system and the calculated frequency response, and
output a relationship between the characteristic of the shaft coupling and at least one of an amplitude of the torque command, an amplitude of the drive torque at a resonance frequency of the shaft coupling, an amplitude of the rotation angle at the resonance frequency, and an amplitude of the angular velocity at the resonance frequency.

6. The characteristic evaluation device according to claim 5, wherein the processor is configured to:
acquire a torsional rigidity of the shaft coupling for the calculated frequency response corresponding to each amplitude, and
output a relationship between the torsional rigidity of the shaft coupling and at least one of the amplitude of the torque command, the amplitude of the drive torque at the resonance frequency, the amplitude of the rotation angle at the resonance frequency, and the amplitude of the angular velocity at the resonance frequency.

7. The characteristic evaluation device according to claim 5, wherein the processor is configured to:
output the torque command to the motor control unit so as to output the drive torque of plural amplitudes,
acquire the frequency response corresponding to each amplitude,
calculate a coefficient of viscosity of the shaft coupling for the acquired frequency response corresponding to each amplitude, and
output a relationship between the coefficient of viscosity of the shaft coupling and at least one of the amplitude of the torque command, the amplitude of the drive torque at the resonance frequency, the amplitude of the rotation angle at the resonance frequency, and the amplitude of the angular velocity at the resonance frequency.

8. A characteristic evaluation method of a shaft coupling for evaluating a characteristic of the shaft coupling by using a characteristic evaluation device, the shaft coupling being configured to connect a drive shaft and a driven shaft so as to transmit torque from the drive shaft to the driven shaft, the characteristic evaluation device comprising:
a motor system including a drive motor configured to apply drive torque to the drive shaft, a rotation angle sensor configured to acquire a rotation angle of the drive shaft, and a motor control unit configured to control the drive motor based on a given torque command so as to cause the drive motor to output torque corresponding to the torque command; and
a rotational load connected to the driven shaft,
wherein the characteristic evaluation device is configured to output the torque command to the motor control unit so as to output the drive torque of a prescribed value and configured to calculate a frequency response of a gain of an amplitude of an angular velocity of the rotation angle against an amplitude of the torque corresponding to the torque command based on the rotation angle detected by the rotation angle sensor,
the characteristic evaluation method comprising:
acquiring the frequency response in a state where the shaft coupling connects the drive shaft and the driven shaft; and
calculating the characteristic of the shaft coupling based on the acquired frequency response and a response characteristic of the motor system.

9. The characteristic evaluation method according to claim 8, comprising:
acquiring the frequency response in a state where the shaft coupling is connected;
acquiring a resonance frequency of the shaft coupling and the gain at the resonance frequency based on the frequency response;
calculating a torsional rigidity of the shaft coupling by using the resonance frequency; and
calculating a coefficient of viscosity of the shaft coupling by using the torsional rigidity, the gain at the resonance frequency, and a transfer function until when the drive motor is driven according to the torque command as the response characteristic of the motor system and generates the torque corresponding the torque command.

10. The characteristic evaluation method according to claim 9, wherein in the step of calculating the coefficient of viscosity of the shaft coupling,
converting, by using the transfer function, the gain at the resonance frequency into a converted value corresponding to the gain at the resonance frequency in a case where the transfer function is one, and
calculating the coefficient of viscosity of the shaft coupling by using the torsional rigidity and the converted value.

11. The characteristic evaluation method according to claim 8, comprising acquiring the response characteristic of the motor system based on the frequency response at a time the drive motor is driven in a state where the shaft coupling is not connected to the drive shaft and the driven shaft.

12. The characteristic evaluation method according to claim 8, comprising:
causing the motor system to output the drive torque of plural amplitudes in a state where the shaft coupling connects the drive shaft and the driven shaft,
acquiring the frequency response corresponding to each amplitude, and
calculating the characteristic of the shaft coupling corresponding to each amplitude based on the acquired frequency response and the response characteristic of the motor system.

13. The characteristic evaluation method according to claim 12, comprising:
acquiring the frequency response corresponding to plural amplitudes in a state where the shaft coupling is connected,
acquiring a resonance frequency of the shaft coupling and the gain at the resonance frequency based on the frequency response corresponding to each amplitude,
calculating a torsional rigidity of the shaft coupling corresponding to each amplitude by using the resonance frequency, and
outputting a relationship between the torsional rigidity of the shaft coupling and at least one of an amplitude of the torque command, an amplitude of the drive torque at the resonance frequency, an amplitude of the rotation angle at the resonance frequency, and an amplitude of the angular velocity at the resonance frequency.

14. The characteristic evaluation method according to claim 13, comprising:
calculating a coefficient of viscosity of the shaft coupling at each amplitude by using the torsional rigidity, the gain at the resonance frequency, and a transfer function until when the drive motor is driven according to the torque command as the response characteristic of the motor system and generates the torque corresponding the torque command; and
outputting a relationship between the coefficient of viscosity of the shaft coupling and at least one of the amplitude of the torque command, the amplitude of the drive torque at the resonance frequency, the amplitude of the rotation angle at the resonance frequency, and the amplitude of the angular velocity at the resonance frequency.

* * * * *